United States Patent
Ikai et al.

(10) Patent No.: US 11,206,429 B2
(45) Date of Patent: Dec. 21, 2021

(54) IMAGE DECODING DEVICE AND IMAGE ENCODING DEVICE

(71) Applicants: Sharp Kabushiki Kaisha, Sakai (JP); FG Innovation Company Limited, Tuen Mun (HK)

(72) Inventors: Tomohiro Ikai, Sakai (JP); Tomoko Aono, Sakai (JP); Yukinobu Yasugi, Sakai (JP); Tomonori Hashimoto, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 17/151,880

(22) Filed: Jan. 19, 2021

(65) Prior Publication Data
US 2021/0144406 A1 May 13, 2021

Related U.S. Application Data

(63) Continuation of application No. 16/608,238, filed as application No. PCT/JP2018/016407 on Apr. 23, 2018, now Pat. No. 10,939,137.

(30) Foreign Application Priority Data

Apr. 28, 2017 (JP) ................. 2017-090481

(51) Int. Cl.
*H04N 19/61* (2014.01)
*H04N 19/122* (2014.01)
*H04N 19/146* (2014.01)
*H04N 19/18* (2014.01)
*H04N 9/77* (2006.01)
*H04N 19/96* (2014.01)

(52) U.S. Cl.
CPC ............... *H04N 19/61* (2014.11); *H04N 9/77* (2013.01); *H04N 19/122* (2014.11); *H04N 19/146* (2014.11); *H04N 19/18* (2014.11); *H04N 19/96* (2014.11)

(58) Field of Classification Search
CPC .... H04N 19/61; H04N 19/122; H04N 19/146; H04N 19/18; H04N 19/77; H04N 19/96
USPC .................................................. 375/240.02
See application file for complete search history.

(56) References Cited

U.S. PATENT DOCUMENTS

| | | | |
|---|---|---|---|
| 2014/0369426 A1* | 12/2014 | Li | H04N 19/30 375/240.29 |
| 2015/0264372 A1* | 9/2015 | Kolesnikov | H04N 19/423 375/240.16 |

FOREIGN PATENT DOCUMENTS

JP 2015-080262 A 4/2015

OTHER PUBLICATIONS

Ikai et al., "Image Decoding Device and Image Encoding Device", U.S. Appl. No. 16/608,238, filed Oct. 25, 2019.

* cited by examiner

*Primary Examiner* — Allen C Wong
(74) *Attorney, Agent, or Firm* — Keating & Bennett, LLP

(57) ABSTRACT

An image decoding device (31) includes a transform coefficient decoding unit (311) configured to decode a transform coefficient for a transform tree included in a coding unit. In the transform tree, the transform coefficient decoding unit splits a transform unit corresponding to luminance and then decodes the transform coefficient related to the luminance, and does not split the transform unit corresponding to chrominance and decodes the transform coefficient related to the chrominance.

1 Claim, 24 Drawing Sheets

IMAGE DECODING DEVICE AND IMAGE ENCODING DEVICE

TECHNICAL FIELD

The embodiments of the present invention relate to a prediction image generation device, an image decoding device, and an image encoding device.

BACKGROUND ART

A video encoding device which generates coded data by coding a video, and a video decoding device which generates decoded images by decoding the coded data are used to transmit or record a video efficiently.

For example, specific video coding schemes include methods suggested in H.264/AVC and High-Efficiency Video Coding (HEVC).

In such a video coding scheme, images (pictures) constituting a video are managed by a hierarchy structure including slices obtained by splitting images, Coding Tree Units (CTUs) obtained by splitting the slices, units of coding (also referred to as Coding Units (CUs)) obtained by splitting the coding tree units, prediction units (PUs) which are blocks obtained by splitting the coding units, and transform units (TUs), and are coded/decoded for each CU.

In such a video coding scheme, usually, a prediction image is generated based on local decoded images obtained by coding/decoding input images, and prediction residual (also sometimes referred to as "difference images" or "residual images") obtained by subtracting the prediction images from input images (original image) are coded. Generation methods of prediction images include an inter-screen prediction (an inter prediction) and an intra-screen prediction (intra prediction).

An example of a technique of recent video coding and decoding is described in NPL 1.

In association with the prediction unit (PU) and the transform unit (TU) described above, there is a technique of using tree structures with a difference in luminance and chrominance in an intra picture, i.e., tree structures (a QTBT, a 444 independent tree, and the like) in a CTB with a difference in luminance and chrominance, by independently splitting, decoding, and the like on a luminance block and a chrominance block. In a case that different structures are used for luminance and chrominance, a large transform size can be employed in chrominance having mild variation. Thus, coding processing or decoding processing can be performed, with energy of prediction residuals being concentrated. An inter prediction technique (merge mode) for generating a prediction image with a small code amount by using a neighboring prediction parameter, and an intra prediction technique (CCLM, Cross-component Linear Model) prediction for generating a prediction image of chrominance from a luminance image have been known. In a technique of coding each of a luminance image and a chrominance image in different pictures, independent tree structures for luminance and chrominance are present.

CITATION LIST

Non Patent Literature

NPL 1: "Algorithm Description of Joint Exploration Test Model 5 (JEM5)", JVET-E1001-v2, Joint Video Exploration Team (JVET) of ITU-T SG 16 WP 3 and ISO/IEC JTC 1/SC 29/WG 11, 12-20 Jan. 2017

SUMMARY OF INVENTION

Technical Problem

However, in the technique of using different tree structures for luminance and chrominance as described above, the code amount necessary for tree structures is increased. In a case that different tree structures are applied in an inter picture (a picture using a prediction in a time direction, e.g., a unidirectional prediction or a bidirectional prediction), motion information (a skip flag, a merge index motion vector difference, or the like) is also required for chrominance. Thus, there is a problem of increasing the code amount. In a case that intra prediction and inter prediction are combined by using independent different tree structures for luminance and chrominance, there is a problem of increasing the code amount necessary for tree structures as described above.

One aspect of the present invention has been made in view of the problems described above, and a main object thereof is to provide a technique for reducing a code amount in a case that different tree structures and/or different prediction methods are applied for luminance and chrominance.

Solution to Problem

To solve the problems described above, an image encoding device according to one aspect of the present invention is an image decoding device for decoding a picture for a coding unit, the image decoding device including a transform coefficient decoding unit configured to decode a transform coefficient for a transform tree included in the coding unit, wherein in the transform tree, the transform coefficient decoding unit splits a transform unit corresponding to luminance and then decodes the transform coefficient related to the luminance, and does not split the transform unit corresponding to chrominance and decodes the transform coefficient related to the chrominance.

To solve the problems described above, an image encoding device according to one aspect of the present invention is an image encoding device for coding a picture for a coding unit, the image encoding device including a transform coefficient coding unit configured to code a transform coefficient for a transform tree included in the coding unit, wherein in the transform tree, the transform coefficient coding unit splits a transform unit corresponding to luminance and then codes the transform coefficient related to the luminance, and does not split the transform unit corresponding to chrominance and codes the transform coefficient related to the chrominance.

To solve the problems described above, an image decoding device according to one aspect of the present invention is an image decoding device for decoding a picture for a coding unit, the image decoding device including a prediction image generation unit configured to generate a prediction image for a prediction unit included in the coding unit, wherein the prediction image generation unit generates the prediction image related to luminance in a target prediction unit, by using a prediction parameter of a reference unit, and generates the prediction image related to chrominance in the target prediction unit, with reference to the prediction image related to the luminance in the target prediction unit.

Advantageous Effects of Invention

In a case that different tree structures and/or different prediction methods are applied for luminance and chrominance, the code amount can be reduced.

DESCRIPTION OF EMBODIMENTS

First Embodiment

Hereinafter, embodiments of the present invention are described with reference to the drawings.

Figure 1:
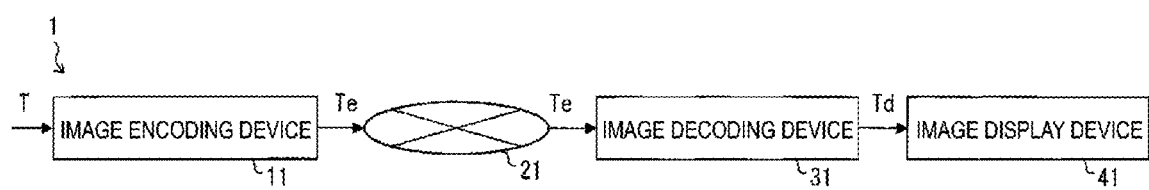
FIG. 1 is a schematic diagram illustrating a configuration of an image transmission system according to one embodiment of the present invention.

FIG. 1 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image encoding device (video encoding device) 11, a network 21, an image decoding device (video decoding device) 31, and an image display device 41.

An image T indicating an image of a single layer or multiple layers is input to the image encoding device 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. In a case of not performing a prediction, in a case of (simulcast), coded data can be compiled.

The network 21 transmits a coding stream Te generated by the image encoding device 11 to the image decoding device 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blue-ray Disc (BD).

The image decoding device 31 decodes each of the coding streams Te transmitted by the network 21, and generates one or multiple decoded images Td.

The image display device 41 displays all or part of one or multiple decoded images Td generated by the image decoding device 31. For example, the image display device 41 includes a display device such as a liquid crystal display and an organic Electro-luminescence (EL) display. In spatial scalable coding and SNR scalable coding, in a case that the image decoding device 31 and the image display device 41 have high processing capability, an enhanced layer image having high image quality is displayed, and in a case of having lower processing capability, a base layer image which does not require as high processing capability and display capability as an enhanced layer is displayed.

Operator

Operators used herein will be described below.

>> is a right bit shift, << is a left bit shift, & is a bitwise AND, | is a bitwise OR, and |= is an OR assignment operator.

x?y:z is a ternary operator to take y in a case that x is true (other than 0), and take z in a case that x is false (0).

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

X mod Y is the remainder in a case that X is divided by Y.

Structure of Coding Stream Te

Prior to the detailed description of the image encoding device 11 and the image decoding device 31 according to the present embodiment, the data structure of the coding stream Te generated by the image encoding device 11 and decoded by the image decoding device 31 will be described.

Figure 2:
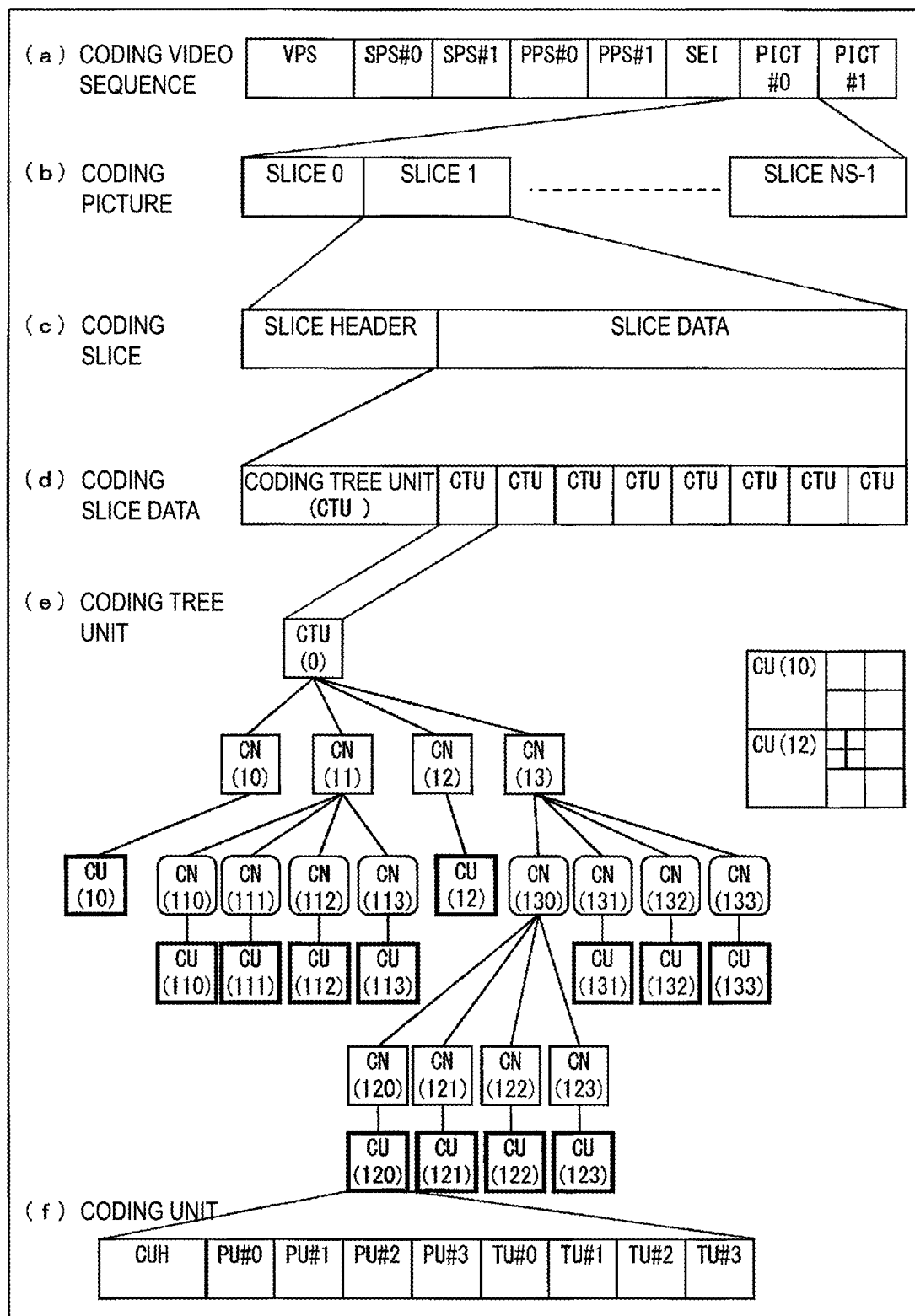
FIG. 2 is a diagram illustrating a hierarchy structure of data of a coding stream according to one embodiment of the present invention, wherein (a) to (f) of FIG. 2 are diagrams indicating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

FIG. 2 is a diagram illustrating the hierarchy structure of data in the coding stream Te. The coding stream Te includes a sequence and multiple pictures constituting a sequence illustratively. (a) to (f) of FIG. 2 are diagrams indicating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referred to by the image decoding device 31 to decode the sequence SEQ of a processing target is prescribed. As illustrated in (a) of FIG. 2, the sequence SEQ includes a Video Parameter Set, a Sequence Parameter Set SPS, a Picture Parameter Set PPS, a picture PICT, and Supplemental Enhancement Information SEI. Here, a value indicated after # indicates a layer ID. In FIG. 2, although an example is illustrated where coded data of #0 and #1, in other words, layer 0 and layer 1 exists, types of layers and the number of layers do not depend on this.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referred to by the image decoding device 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the image decoding device 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the image decoding device 31 to decode the picture PICT of a processing target is prescribed. As illustrated in (b) of FIG. 2, the picture PICT includes slices S0 to SNS−1 (NS is the total number of slices included in the picture PICT).

Note that in a case not necessary to distinguish the slices S0 to SNS−1 below, subscripts of reference signs may be omitted and described. The same applies to other data included in the coding stream Te described below and described with an added subscript.

Coding Slice

In the coding slice, a set of data referred to by the image decoding device 31 to decode the slice S of a processing target is prescribed. As illustrated in (c) of FIG. 2, the slice S includes a slice header SH and a slice data SDATA.

The slice header SH includes a coding parameter group referred to by the image decoding device 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference (pic_parameter_set_id) to the picture parameter set PPS included in the coding video sequence.

Coding Slice Data

In the coding slice data, a set of data referred to by the image decoding device 31 to decode the slice data SDATA of a processing target is prescribed. As illustrated in (d) of FIG. 2, the slice data SDATA includes Coding Tree Units (CTUs). The CTU is a block of a fixed size (for example, 64×64) constituting a slice, and may be referred to as a Largest Coding Unit (LCU).

Coding Tree Unit

As illustrated in (e) of FIG. 2, a set of data referred to by the image decoding device 31 to decode a coding tree unit of a processing target is prescribed. The coding tree unit is split by recursive quad tree splits (QT splits) or binary tree splits (BT splits). Nodes of a tree structure obtained by recursive quad tree splits or binary tree splits are referred to as Coding Nodes (CNs). Intermediate nodes of quad trees and binary trees are a Coding Tree (CT), and the coding tree unit itself is also prescribed as the highest layer of Coding Tree.

The CTU includes a QT split flag (cu_split_flag) indicating whether or not to perform a QT split and a BT split mode (split_bt_mode) indicating a split method of a BT split. In a case that cu_split_flag is 1, the CTU is split into four coding node CNs. In a case that cu_split_flag is 0, the coding node CN is not split, and has one Coding Unit (CU) as a node.

The coding unit CU is an end node (leaf node) of the coding nodes, and is not split anymore. The coding unit CU is a basic unit of coding processing.

For example, in a case that a size of the coding tree unit CTU is 64×64 pixels, a size of the coding unit may take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, and 8×8 pixels.

Coding Unit

As illustrated in (f) of FIG. 2, a set of data referred to by the image decoding device 31 to decode the coding unit of a processing target is prescribed. Specifically, the coding unit includes a prediction tree, a transform tree, and a CU header CUH. In the CU header, a prediction mode, a split method (PU split mode), and the like are prescribed.

In the prediction tree, prediction information (a reference picture index, a motion vector, and the like) of each prediction unit (PU) where the coding unit is split into one or multiple is prescribed. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "subblock". The subblock includes multiple pixels. In a case that the sizes of the prediction unit and the subblock are the same, there is one subblock in the prediction unit. In a case that the prediction unit is larger than the size of the subblock, the prediction unit is split into subblocks. For example, in a case that the prediction unit is 8×8, and the subblock is 4×4, the prediction unit is split into four subblocks formed by horizontal split into two and vertical split into two.

The prediction processing may be performed for each of these prediction units (subblocks).

Generally speaking, there are two types of splits in the prediction tree, including a case of an intra prediction and a case of an inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry split of 1:3 and 3:1. The PUs included in the CU are expressed as PU0, PU1, PU2, and PU3 sequentially.

Figure 3:
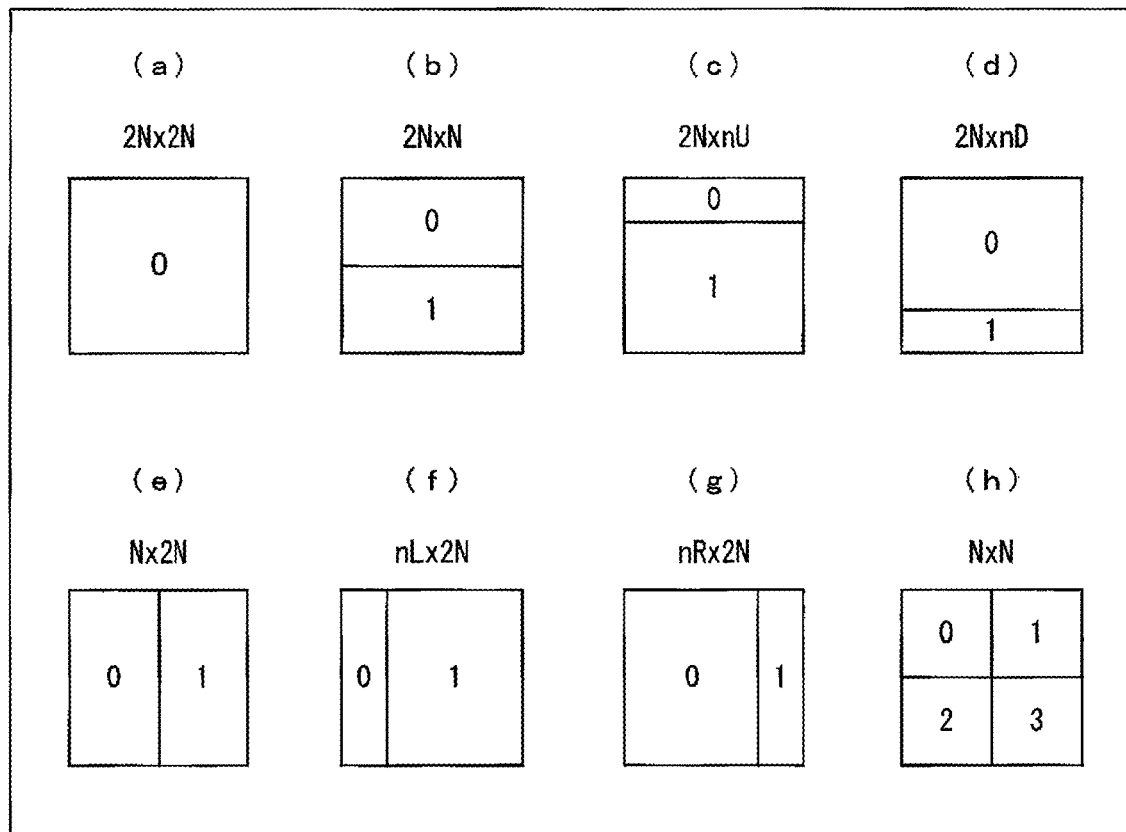
FIG. 3 is a diagram illustrating patterns of PU split modes. (a) to (h) illustrate partition shapes in cases that PU split modes are 2N×2N, 2N×N, 2N×nU, 2N×nD, N×2N, nL×2N, nR×2N, and N×N, respectively.

(a) to (h) of FIG. 3 illustrate shapes of partitions in respective PU split modes (positions of boundaries of PU splits) specifically. (a) of FIG. 3 indicates a partition of 2N×2N, and (b), (c), and (d) of FIG. 3 indicate partitions (horizontally long partitions) of 2N×N, 2N×nU, and 2N×nD, respectively. (e), (f), and (g) of FIG. 3 illustrate partitions (vertically long partitions) in cases of N×2N, nL×2N, and nR×2N, respectively, and (h) of FIG. 3 illustrates a partition of N×N. Note that horizontally long partitions and vertically long partitions are collectively referred to as rectangular partitions, and 2N×2N and N×N are collectively referred to as square partitions.

In the Transform Tree (TT), the coding unit is split into one or multiple Transform Units (TUs), and a position and a size of each transform unit are prescribed. In another expression, the transform unit is one or multiple non-overlapping regions constituting the coding unit. The transform tree includes one or multiple transform units obtained by the above-mentioned split.

Splits in the transform tree include a split to allocate a region that is the same size as the coding unit as a transform unit, and a split producing transform units by performing quad tree splits (TU splits) on the CU similar to the above-mentioned split of CUs. A transform processing is performed for each of these transform units.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameters) will be described below. The inter prediction parameter includes prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real devices and methods.

For example, syntax elements to derive inter prediction parameters included in a coded data include a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

Figure 4:
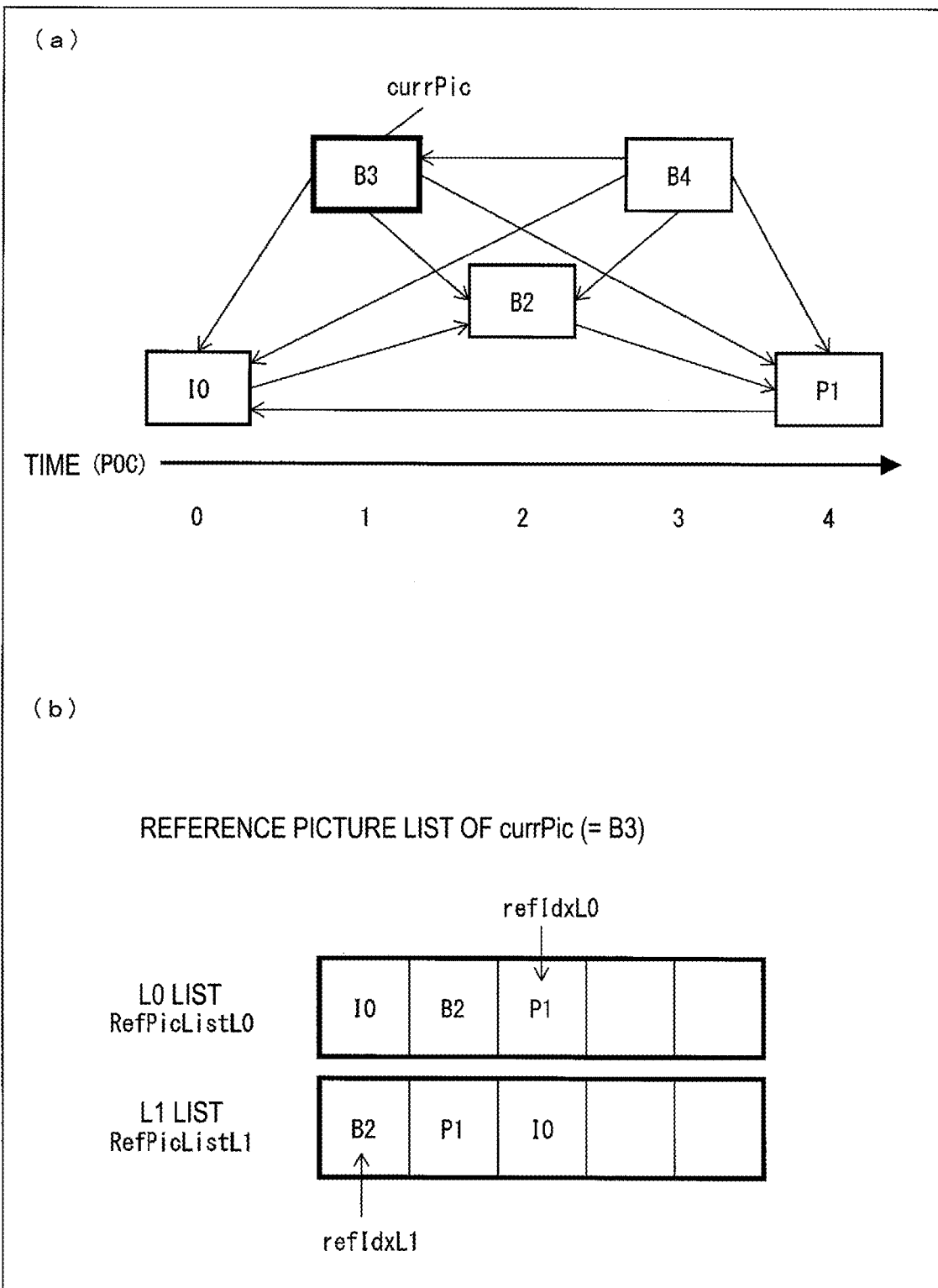
FIG. 4 is a conceptual diagram illustrating an example of reference pictures and reference picture lists, wherein (a) of FIG. 4 illustrates reference relationships of a current picture, and (b) of FIG. 4 indicates an example of reference picture lists.

A reference picture list is a list including reference pictures stored in a reference picture memory 306. FIG. 4 is a conceptual diagram illustrating an example of reference pictures and reference picture lists. In (a) of FIG. 4, a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. (b) of FIG. 4 indicates an example of reference picture lists. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, and the reference picture includes these pictures as elements. For an individual prediction unit, which picture in a reference picture list RefPicListX is actually referred to is specified with a reference picture index refIdxLX. The diagram indicates an example where reference pictures P1 and B2 are referred to by refIdxL0 and refIdxL1.

Merge Prediction and AMVP Prediction

Decoding (coding) methods of prediction parameters include a merge prediction (merge) mode and an Adaptive Motion Vector Prediction (AMVP) mode, and a merge flag merge_flag is a flag to identify these. The merge prediction mode is a mode to use prediction parameters of neighboring PUs already processed without including a prediction list utilization flag predFlagLX (or an inter prediction indicator inter_pred_idc), a reference picture index refIdxLX, and a motion vector mvLX in a coded data, and the AMVP mode is a mode to include an inter prediction indicator inter_pred_idc, a reference picture index refIdxLX, a motion vector mvLX in a coded data. Note that, the motion vector mvLX is coded as a prediction vector index mvp_LX_idx identifying a prediction vector mvpLX and a difference vector mvdLX.

The inter prediction indicator inter_pred_idc is a value indicating types and the number of reference pictures, and takes any value of PRED_L0, PRED_L1, and PRED_BI. PRED_L0 and PRED_L1 indicate to use reference pictures managed in the reference picture list of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_LX_idx is an index indicating a prediction vector, and the reference picture index refIdxLX is an index indicating reference pictures managed in a reference picture list. Note that LX is a description method used in a case of not distinguishing the L0 prediction and the L1 prediction, and distinguishes parameters for the L0 list and parameters for the L1 list by replacing LX with L0 and L1.

The merge index merge_idx is an index to indicate to use either prediction parameter as a prediction parameter of a decoding target PU among prediction parameter candidates (merge candidates) derived from PUs of which the processing is completed.

Motion Vector

The motion vector mvLX indicates a gap quantity between blocks in two different pictures. A prediction vector and a difference vector related to the motion vector mvLX are referred to as a prediction vector mvpLX and a difference vector mvdLX respectively.

Inter Prediction Indicator inter_pred_idc and Prediction List Utilization Flag predFlagLX A relationship between an inter prediction indicator inter_pred_idc and prediction list utilization flags predFlagL0 and predFlagL1 are as follows, and those can be converted mutually.

inter_pred_idc=(predFlag$L$1<<1)+predFlag$L$0 predFlagL0=inter_pred_idc & 1 predFlagL1=inter_pred_idc>>1

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred of whether or not a bi-prediction BiPred can be derived from whether or not two prediction list utilization flags are both 1. For example, the flag can be derived by the following equation.

biPred=(predFlag$L$0==1 && predFlag$L$1==1)

The flag biPred can be also derived from whether an inter prediction indicator is a value indicating to use two prediction lists (reference pictures). For example, the flag can be derived by the following equation.

biPred=(inter_pred_idc==PRED_BI)?1:0

The above equation can be also expressed with the following equation.

biPred=(inter_pred_idc==PRED_BI)

Note that, for example, PRED_BI can use the value of 3.

Configuration of Image Decoding Device

Figure 5:
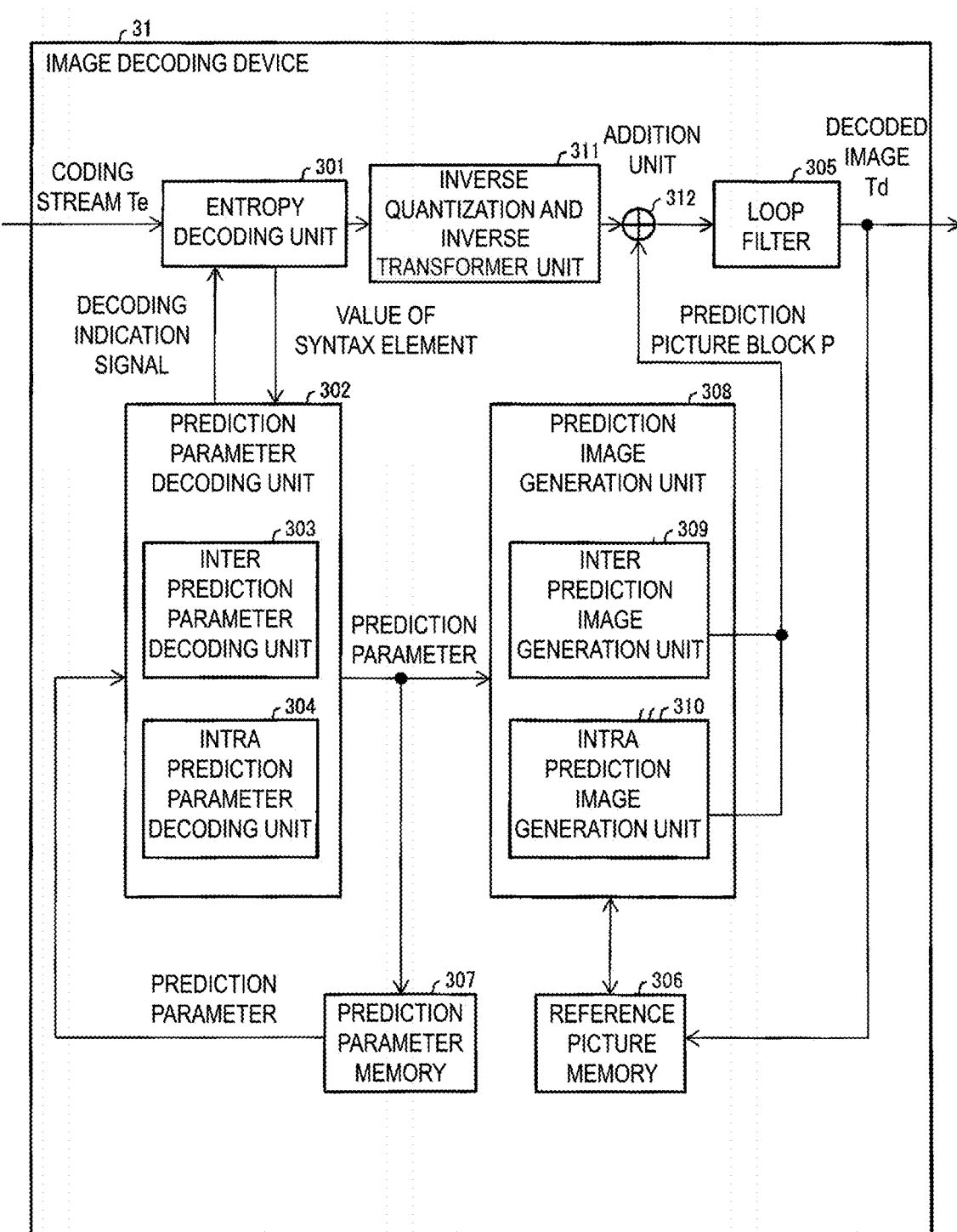
FIG. 5 is block diagram illustrating a configuration of an image encoding device according to one embodiment of the present invention.

A configuration of the image decoding device 31 according to the present embodiment will now be described. FIG. 5 is a schematic diagram illustrating a configuration of the image decoding device 31 according to the present embodiment. The image decoding device 31 includes an entropy decoding unit 301, a prediction parameter decoding unit (a prediction image decoding device) 302, a loop filter 305, a reference picture memory 306, a prediction parameter memory 307, a prediction image generation unit (a prediction image generation device) 308, an inverse quantization and inverse transformer unit 311, and an addition unit 312.

The prediction parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310.

The entropy decoding unit 301 performs entropy decoding on the coding stream Te input from the outside, and separates and decodes individual codes (syntax elements). Separated codes include prediction information to generate a prediction image and residual information to generate a difference image and the like.

The entropy decoding unit 301 outputs a part of the separated codes to the prediction parameter decoding unit 302. For example, a part of the separated codes includes a prediction mode predMode, a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX. The control of which code to decode is performed based on an indication of the prediction parameter decoding unit 302. The entropy decoding unit 301 outputs quantization coefficients to the inverse quantization and inverse transformer unit 311. These quantization coefficients are coefficients obtained by performing frequency transform, such as Discrete Cosine Transform (DCT), Discrete Sine Transform (DST), and Karyhnen Loeve Transform (KLT), on residual signals to quantize in coding processing.

The inter prediction parameter decoding unit 303 decodes an inter prediction parameter with reference to a prediction parameter stored in the prediction parameter memory 307, based on a code input from the entropy decoding unit 301.

The inter prediction parameter decoding unit 303 outputs a decoded inter prediction parameter to the prediction image generation unit 308, and also stores the decoded inter prediction parameter in the prediction parameter memory 307. Details of the inter prediction parameter decoding unit 303 will be described later.

The intra prediction parameter decoding unit 304 decodes an intra prediction parameter with reference to a prediction parameter stored in the prediction parameter memory 307, based on a code input from the entropy decoding unit 301.

The intra prediction parameter is a parameter used in a processing to predict a CU in one picture, for example, an intra prediction mode IntraPredMode. The intra prediction parameter decoding unit 304 outputs a decoded intra prediction parameter to the prediction image generation unit 308, and also stores the decoded intra prediction parameter in the prediction parameter memory 307.

The intra prediction parameter decoding unit 304 may derive different intra prediction modes depending on luminance and chrominance. In this case, the intra prediction parameter decoding unit 304 decodes a luminance prediction mode IntraPredModeY as a prediction parameter of luminance, and decodes a chrominance prediction mode IntraPredModeC as a prediction parameter of chrominance. The luminance prediction mode IntraPredModeY includes 35 modes, and corresponds to a planar prediction (0), a DC prediction (1), and directional predictions (2 to 34). The chrominance prediction mode IntraPredModeC uses any of a planar prediction (0), a DC prediction (1), directional predictions (2 to 34), and an LM mode (35). The intra prediction parameter decoding unit 304 may decode a flag indicating whether IntraPredModeC is a mode same as the luminance mode, assign IntraPredModeY to IntraPredModeC in a case of indicating that the flag is the mode same as the luminance mode, and decode a planar prediction (0), a DC prediction (1), directional predictions (2 to 34), and an LM mode (35) as IntraPredModeC in a case of indicating that the flag is a mode different from the luminance mode.

The loop filter 305 applies a filter such as a deblocking filter, a sample adaptive offset (SAO), and an adaptive loop filter (ALF) on a decoded image of a CU generated by the addition unit 312.

The reference picture memory 306 stores a decoded image of a CU generated by the loop filter 305 in a prescribed position for each picture and CU of a decoding target.

The prediction parameter memory 307 stores a prediction parameter in a prescribed position for each picture and prediction unit (or a subblock, a fixed size block, and a pixel) of a decoding target. Specifically, the prediction parameter memory 307 stores an inter prediction parameter decoded by the inter prediction parameter decoding unit 303, an intra prediction parameter decoded by the intra prediction parameter decoding unit 304 and a prediction mode predMode separated by the entropy decoding unit 301. For example, inter prediction parameters stored include a prediction list utilization flag predFlagLX (the inter prediction indicator inter_pred_idc), a reference picture index refIdxLX, and a motion vector mvLX.

To the prediction image generation unit 308, a prediction mode predMode input from the entropy decoding unit 301 is input, and a prediction parameter is input from the prediction parameter decoding unit 302. The prediction image generation unit 308 reads a reference picture from the reference picture memory 306. The prediction image generation unit 308 generates a prediction image of a PU or a subblock by using a prediction parameter input and a reference picture (reference picture block) read, with a prediction mode indicated by the prediction mode predMode.

Here, in a case that the prediction mode predMode indicates an inter prediction mode, the inter prediction image generation unit 309 generates a prediction image of a PU or a subblock by an inter prediction by using an inter prediction parameter input from the inter prediction parameter decoding unit 303 and a read reference picture (reference picture block).

For a reference picture list (an L0 list or an L1 list) where a prediction list utilization flag predFlagLX is 1, the inter prediction image generation unit 309 reads a reference picture block from the reference picture memory 306 in a position indicated by a motion vector mvLX, based on a decoding target PU from reference pictures indicated by the reference picture index refIdxLX. The inter prediction image generation unit 309 performs a prediction based on a read reference picture block and generates a prediction image of a PU. The inter prediction image generation unit 309 outputs the generated prediction image of the PU to the addition unit 312. Here, the reference picture block is a set of pixels of a reference picture (referred to as a block because the reference picture block usually has a rectangular shape), and is a region referred to in order to generate a prediction image of a PU or a subblock.

In a case that the prediction mode predMode indicates an intra prediction mode, the intra prediction image generation unit 310 performs an intra prediction by using an intra prediction parameter input from the intra prediction parameter decoding unit 304 and a read reference picture. Specifically, the intra prediction image generation unit 310 reads an adjacent PU, which is a picture of a decoding target, in a prescribed range from a decoding target PU among PUs already decoded, from the reference picture memory 306. The prescribed range is, for example, any of adjacent PUs on the left, top left, top, and top right in a case that a decoding target PU moves in order of so-called raster scan sequentially, and varies according to intra prediction modes. The order of the raster scan is an order to move sequentially from the left edge to the right edge in each picture for each row from the top edge to the bottom edge.

The intra prediction image generation unit 310 performs a prediction in a prediction mode indicated by the intra prediction mode IntraPredMode, based on a read adjacent PU, and generates a prediction image of a PU. The intra prediction image generation unit 310 outputs the generated prediction image of the PU to the addition unit 312.

In a case that the intra prediction parameter decoding unit 304 derives different intra prediction modes depending on luminance and chrominance, the intra prediction image generation unit 310 generates a prediction image of a PU of luminance by any of a planar prediction (0), a DC prediction (1), and directional predictions (2 to 34) depending on a luminance prediction mode IntraPredModeY, and generates a prediction image of a PU of chrominance by any of a planar prediction (0), a DC prediction (1), directional predictions (2 to 34), and LM mode (35) depending on a chrominance prediction mode IntraPredModeC.

The inverse quantization and inverse transformer unit 311 performs inverse quantization on quantization coefficients input from the entropy decoding unit 301 and calculates transform coefficients. The inverse quantization and inverse transformer unit 311 performs inverse frequency transform, such as inverse DCT, inverse DST, and inverse KLT, on the calculated transform coefficients to calculate residual signals. The inverse quantization and inverse transformer unit 311 outputs the calculated residual signals to the addition unit 312.

The addition unit 312 adds a prediction image of a PU input from the inter prediction image generation unit 309 or the intra prediction image generation unit 310 and a residual signal input from the inverse quantization and inverse transformer unit 311 for each pixel, and generates a decoded image of a PU. The loop filter 305 stores the generated decoded image of a PU in the reference picture memory 306, and outputs a decoded image Td in which the generated decoded image of the PU is integrated for each picture to the outside.

Configuration of Image Encoding Device

Figure 6:
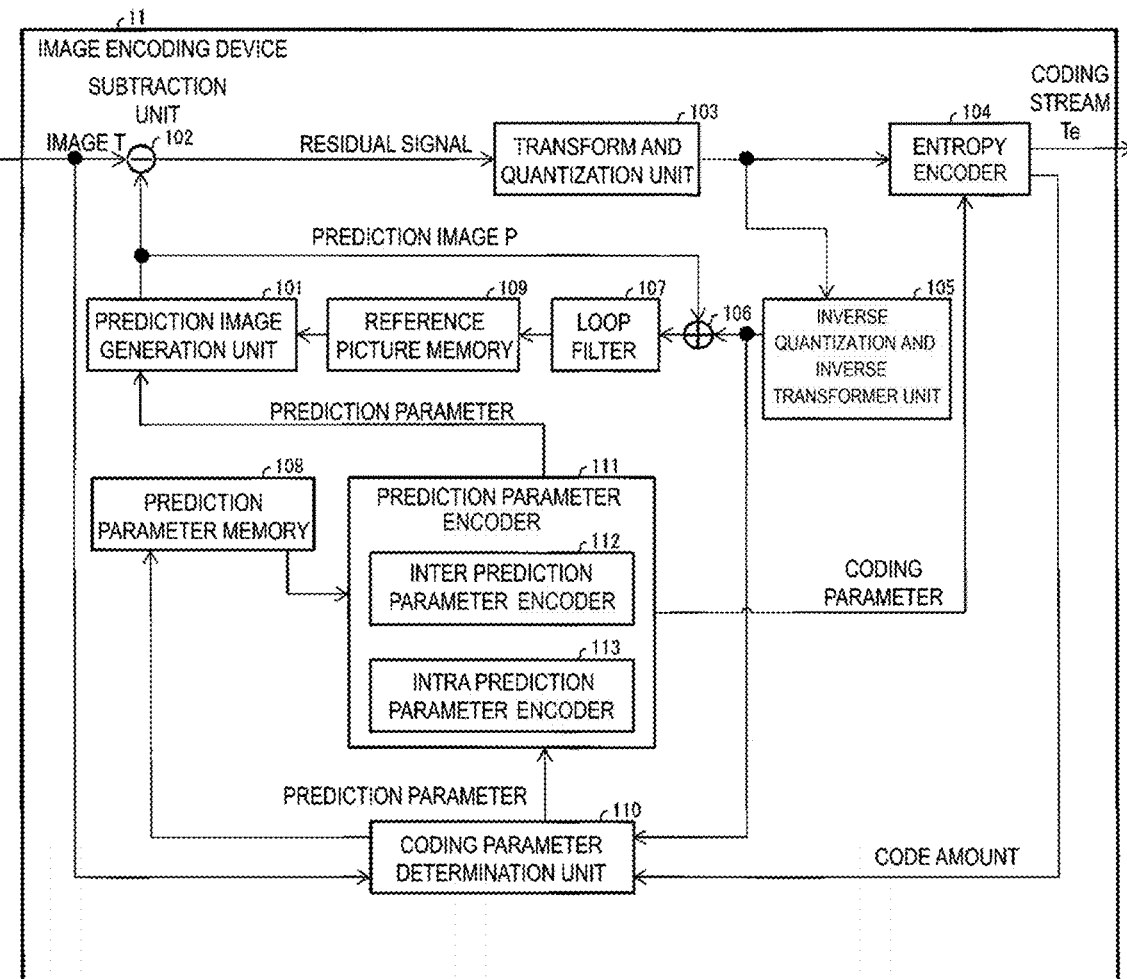
FIG. 6 is a schematic diagram illustrating a configuration of an image decoding device according to one embodiment of the present invention.

A configuration of the image encoding device 11 according to the present embodiment will now be described. FIG. 6 is a block diagram illustrating a configuration of the image encoding device 11 according to the present embodiment. The image encoding device 11 includes a prediction image generation unit 101, a subtraction unit 102, a transform and quantization unit 103, an entropy encoder 104, an inverse quantization and inverse transformer unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter encoder 111. The prediction parameter encoder 111 includes an inter prediction parameter encoder 112 and an intra prediction parameter encoder 113.

For each picture of an image T, the prediction image generation unit 101 generates a prediction image P of a prediction unit PU for each coding unit CU that is a region where the picture is split. Here, the prediction image generation unit 101 reads a block that has been decoded from the reference picture memory 109, based on a prediction parameter input from the prediction parameter encoder 111. For example, in a case of an inter prediction, the prediction parameter input from the prediction parameter encoder 111 is a motion vector. The prediction image generation unit 101 reads a block in a position in a reference image indicated by a motion vector starting from a target PU. In a case of an intra prediction, the prediction parameter is, for example, an intra prediction mode. The prediction image generation unit 101 reads a pixel value of an adjacent PU used in an intra prediction mode from the reference picture memory 109, and generates the prediction image P of a PU. The prediction image generation unit 101 generates the prediction image P of a PU by using one prediction scheme among multiple prediction schemes for the read reference picture block. The prediction image generation unit 101 outputs the generated prediction image P of a PU to the subtraction unit 102.

Figure 7:
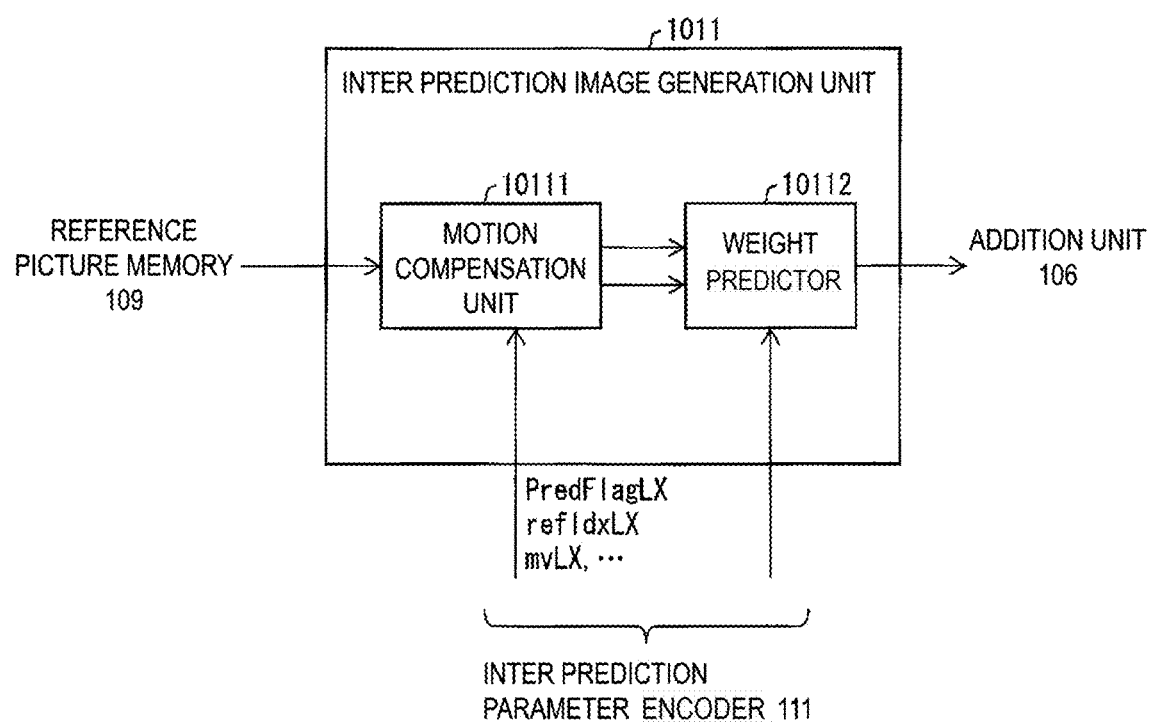
FIG. 7 is a schematic diagram illustrating a configuration of an inter prediction image generation unit of the image encoding device according to one embodiment of the present invention.

Note that the prediction image generation unit 101 performs the same operation as the prediction image generation unit 308 already described. For example, FIG. 7 is a schematic diagram illustrating a configuration of the inter prediction image generation unit 1011 included in the prediction image generation unit 101. The inter prediction image generation unit 1011 includes a motion compensation unit 10111 and a weight predictor 10112.

Motion Compensation

Based on an inter prediction parameter (a prediction list utilization flag predFlagLX, a reference picture index refIdxLX, and a motion vector mvLX) input from the inter prediction parameter encoder 112, the motion compensation unit 10111 reads, from the reference picture memory 109, a block present at a position deviated from a position of a decoding target PU by the amount of the motion vector mvLX in a reference picture specified by the reference picture index refIdxLX. In this manner, the motion compensation unit 10111 generates an interpolation image (a motion compensated image). Here, in a case that accuracy of the motion vector mvLX is not integer-accuracy, a so-called motion compensation filter, which is a filter for generating a pixel at a fractional position, is applied, and a motion compensated image is thereby generated.

Weight Prediction

The weight predictor 10112 multiplies an input motion compensated image predSamplesLX by a weight coefficient(s), and thereby generates a prediction image of the PU. In a case that one of the prediction list utilization flags (predFlagL0 or predFlagL1) is 1 (in a case of a uni-prediction), and a weight prediction is not used, processing of the following equation is performed. The processing of the following equation is for causing the input motion compensated image predSamplesLX (LX is L0 or L1) to match the number of pixel bits bitDepth.

predSamples[$X$][$Y$]=Clip3(0,(1<<bitDepth)−1,(predSamples$LX$[$X$][$Y$]+offset1)>>shift1)

Here, shift1=14−bitDepth, and offset1=1<<(shift1−1).

In a case that both the reference list utilization flags (predFlagL0 and predFlagL1) are 1 (in a case of a bi-prediction BiPred), and a weight prediction is not used, processing of the following equation is performed. The processing of the following equation is for averaging the input motion compensated images predSamplesL0 and predSamplesL1 and causing the resultant value to match the number of pixel bits.

predSamples[$X$][$Y$]=Clip3(0,(1<<bitDepth)−1,(predSamples$L0$[$X$][$Y$]+predSamples$L1$[$X$][$Y$]+offset2)>>shift2)

Here, shift2=15−bitDepth, and offset2=1<<(shift2−1).

In addition, in a case of a uni-prediction, and a weight prediction is performed, the weight predictor 10112 derives a weight prediction coefficient w0 and an offset o0 from coded data, and performs processing of the following equation.

predSamples[$X$][$Y$]=Clip3(0,(1<<bitDepth)−1,((predSamples$LX$[$X$][$Y$]*w0+2^(log 2WD−1))>>log 2WD)+o0)

Here, log 2WD is a variable indicating a prescribed shift amount.

In addition, in a case of a bi-prediction BiPred, and a weight prediction is performed, the weight predictor 10112 derives weight prediction coefficients w0, w1, o0, and of from coded data, and performs processing of the following equation.

predSamples[$X$][$Y$]=Clip3(0,(1<<bitDepth)−1,(predSamples$L0$[$X$][$Y$]*w0+predSamples$L1$[$X$][$Y$]*w1+((o0+o1+1)<<log 2WD))>>(log 2WD+1))

The prediction image generation unit 101 generates the prediction image P of a PU, based on a pixel value of a reference block read from the reference picture memory, by using a parameter input by the prediction parameter encoder. The prediction image generated by the prediction image generation unit 101 is output to the subtraction unit 102 and the addition unit 106.

The subtraction unit 102 subtracts a signal value of the prediction image P of a PU input from the prediction image generation unit 101 from a pixel value of a corresponding PU of the image T, and generates a residual signal. The subtraction unit 102 outputs the generated residual signal to the transform and quantization unit 103.

The transform and quantization unit 103 performs transform for the residual signal input from the subtraction unit 102, and calculates transform coefficients. The transform and quantization unit 103 quantizes the calculated transform coefficients to calculate quantization coefficients. The transform and quantization unit 103 outputs the calculated quantization coefficients to the entropy encoder 104 and the inverse quantization and inverse transformer unit 105.

To the entropy encoder 104, quantization coefficients are input from the transform and quantization unit 103, and coding parameters are input from the prediction parameter encoder 111. For example, input coding parameters include codes such as a reference picture index refIdxLX, a prediction vector index mvp_LX_idx, a difference vector mvdLX, a prediction mode predMode, and a merge index merge_idx.

The entropy encoder 104 performs entropy coding on the input quantization coefficients and coding parameters to generate the coding stream Te, and outputs the generated coding stream Te to the outside.

The inverse quantization and inverse transformer unit 105 performs inverse quantization on the quantization coefficients input from the transform and quantization unit 103 to calculate transform coefficients. The inverse quantization and inverse transformer unit 105 performs inverse frequency transform on the calculated transform coefficients to calculate residual signals. The inverse quantization and inverse transformer unit 105 outputs the calculated residual signals to the addition unit 106.

The addition unit 106 adds signal values of the prediction image P of the PUs input from the prediction image generation unit 101 and signal values of the residual signals input from the inverse quantization and inverse transformer unit 105 for each pixel, and generates the decoded image. The addition unit 106 stores the generated decoded image in the reference picture memory 109.

The loop filter 107 performs a deblocking filter, a sample adaptive offset (SAO), and an adaptive loop filter (ALF) to the decoded image generated by the addition unit 106.

The prediction parameter memory 108 stores the prediction parameters generated by the coding parameter determination unit 110 for each picture and CU of the coding target in a prescribed position.

The reference picture memory 109 stores the decoded image generated by the loop filter 107 for each picture and CU of the coding target in a prescribed position.

The coding parameter determination unit 110 selects one set among multiple sets of coding parameters. A coding parameter is the above-mentioned prediction parameter or a parameter to be a target of coding generated associated with the prediction parameter. The prediction image generation unit 101 generates the prediction image P of the PUs by using each of the sets of these coding parameters.

The coding parameter determination unit 110 calculates cost values indicating a volume of an information quantity and coding errors for each of the multiple sets. For example, a cost value is a sum of a code amount and a value of multiplying a coefficient $\lambda$ by a square error. The code amount is an information quantity of the coding stream Te obtained by performing entropy coding on a quantization error and a coding parameter. The square error is a sum of pixels for square values of residual values of residual signals calculated in the subtraction unit 102. The coefficient $\lambda$ is a real number that is larger than a pre-configured zero. The coding parameter determination unit 110 selects a set of coding parameters by which the calculated cost value is minimized. With this configuration, the entropy encoder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter encoder 111 derives a format for coding from parameters input from the coding parameter determination unit 110, and outputs the format to the entropy encoder 104. A derivation of a format for coding is, for example, to derive a difference vector from a motion vector and a prediction vector. The prediction parameter encoder 111 derives parameters necessary to generate a prediction image from parameters input from the coding parameter determination unit 110, and outputs the parameters to the prediction image generation unit 101. For example, parameters necessary to generate a prediction image are a motion vector of a subblock unit.

The inter prediction parameter encoder 112 derives inter prediction parameters such as a difference vector, based on prediction parameters input from the coding parameter determination unit 110. The inter prediction parameter encoder 112 includes a partly identical configuration to a configuration by which the inter prediction parameter decoding unit 303 (see FIG. 5 and the like) derives inter prediction parameters, as a configuration to derive parameters necessary for generation of a prediction image output to the prediction image generation unit 101. A configuration of the inter prediction parameter encoder 112 will be described later.

The intra prediction parameter encoder 113 derives a format for coding (for example, MPM_idx, rem_intra_luma_pred_mode, and the like) from the intra prediction mode IntraPredMode input from the coding parameter determination unit 110.

Principal Configuration of Image Decoding Device

Figure 10:
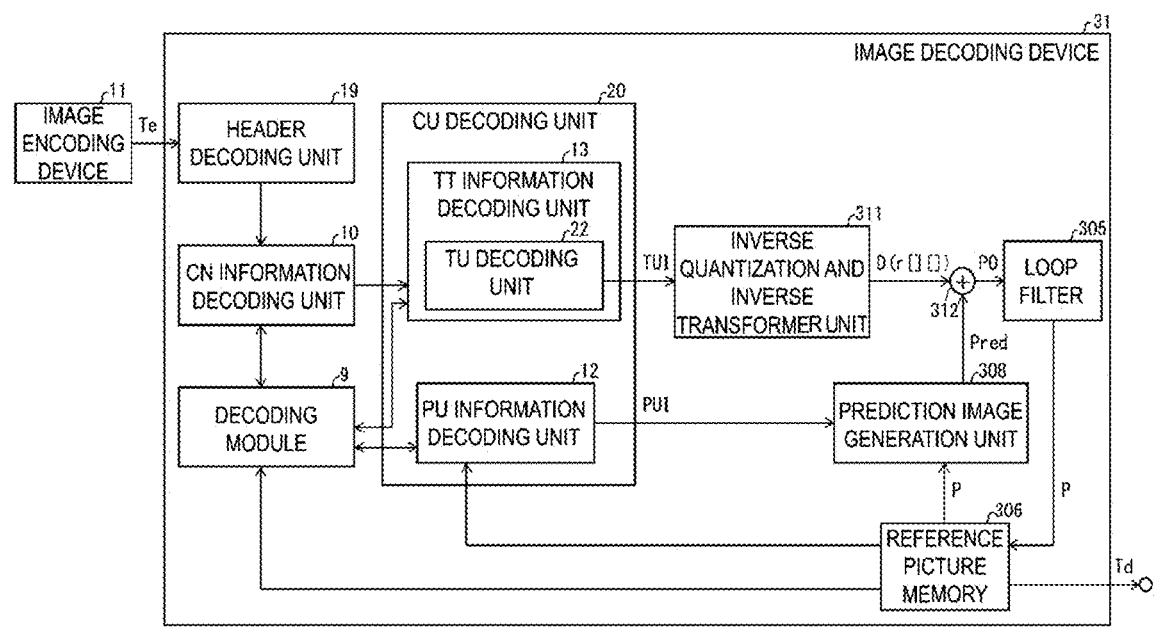
FIG. 10 is a block diagram illustrating a principal configuration of the image decoding device according to Embodiment 1 of the present invention.

FIG. 10 illustrates a block diagram illustrating a principal configuration of the image decoding device according to the present embodiment. In FIG. 10, for the sake of simplifying the drawing, some members included in the block diagram illustrated in FIG. 10 are omitted. For the sake of convenience of description, members having the same function as the members illustrated in FIG. 5 are denoted by the same reference signs, and descriptions thereof will be omitted.

As illustrated in FIG. 10, the image decoding device 31 includes a decoding module 9, a CN information decoding unit 10, a prediction image generation unit 308, an inverse quantization and inverse transformer unit 311, a reference picture memory 306, an addition unit 312, a loop filter 305, a header decoding unit 19, and a CU decoding unit 20. The CU decoding unit 20 further includes a PU information decoding unit 12 and a TT information decoding unit 13 (split information decoding unit, split unit). The TT information decoding unit 13 further includes a TU decoding unit 22.

First, of the functions of each member illustrated in FIG. 10, functions similar to those of related art will be described below in their corresponding sections provided for each member.

Decoding Module

General operation of each module will now be described. The decoding module 9 performs decoding processing of decoding syntax values from binary. More specifically, the decoding module 9 decodes syntax values coded by an entropy coding scheme such as CABAC, based on coded data and a syntax type supplied from sources of supply. Then, the decoding module 9 returns decoded syntax values to the sources of supply.

In the examples given below, sources of supply of coded data and a syntax type are the CN information decoding unit 10 and the CU decoding unit 20 (the PU information decoding unit 12 and the TT information decoding unit 13).

Header Decoding Unit

The header decoding unit 19 decodes a video parameter set (VPS), an SPS, a PPS, and a slice header of coded data input from the image encoding device 11.

CN Information Decoding Unit

The CN information decoding unit 10 uses the decoding module 9 to perform decoding processing of a coding tree unit (CTU) and coding nodes (CNs), for coded data input from the image encoding device 11. Specifically, the CN information decoding unit 10 decodes CTU information and CN information from coded data, according to the following procedure.

First, the CN information decoding unit 10 uses the decoding module 9 to decode a tree unit header CTUH from CTU information included in a CTU. Next, according to the context of a QT split flag indicating whether or not a target CN is to be split by QT split, the CN information decoding unit 10 decodes, from CN information included in a CN, the QT split flag. Then, the CN information decoding unit 10 recursively splits and decodes the target CN until the QT split flag stops notifying the CN information decoding unit 10 of further split. Finally, the CN information decoding unit 10 decodes a tree unit footer CTUF from the CTU information.

Note that the present embodiment describes an example in which CN information to be decoded is a QT split flag (qt_split_flag). However, CN information to be decoded may be a BT split flag (bt_split_flag) indicating whether or not a target CN is to be split by BT (binary tree) split, or a TT split flag (tt_split_flag) indicating whether or not a target CN is to be split by TT (triple tree) split.

The tree unit header CTUH and the tree unit footer CTUF include coding parameters referred to by the image decoding device 31 to determine a decoding method of a target coding tree unit. The CN information may include a BT direction flag (a BT split mode) to be described later and parameters applied to a target CN and to a lower coding node, besides the QT split flag.

CU Decoding Unit

The CU decoding unit 20 includes the PU information decoding unit 12 and the TT information decoding unit 13, and decodes PUI information and TTI information of the lowest coding node CN (i.e., CU).

PU Information Decoding Unit

The PU information decoding unit 12 uses the decoding module 9 to decode PU information (such as a merge flag (merge_flag), a merge index (merge_idx), a prediction vector index (mvp_idx), a reference image index (ref_idx), an inter prediction indicator (inter_pred_flag), and a difference vector (mvd)) of each PU.

TT Information Decoding Unit

The TT information decoding unit 13 uses the decoding module 9 to decode TT information (such as a TU split flag SP_TU (split_transform_flag) and a TU residual flag CBP_TU (cbf_cb, cbf_cr, cbf_luma), and a TU) of a transform tree TT.

The TT information decoding unit 13 includes the TU decoding unit 22. In a case that a TU includes a residual, the TU decoding unit 22 decodes QP update information (quantization correction value). Note that the QP update information is a value indicating a difference value from a quantization parameter prediction value qPpred, which is a prediction value of a quantization parameter QP. The TU decoding unit 22 decodes a quantized prediction residual (residual_coding).

Principal Configuration of Image Decoding Device as Features of Embodiment 1

A principal configuration of the image decoding device 31 as features of the present embodiment will now be described.

The CU decoding unit 20 according to the present embodiment does not split a CU generated by the CN information decoding unit 10, and transmits PUs included in the CU to the PU information decoding unit 12 and transmits TUs included in the CU to the TT information decoding unit 13.

The PU information decoding unit 12 does not split the PUs received from the CU decoding unit 20, and decodes the PU information described above.

Meanwhile, among the TUs received from the CU decoding unit 20, the TT information decoding unit 13 splits a luminance TU, and does not split a chrominance TU. The TU decoding unit 22 included in the TT information decoding unit 13 decodes a quantized prediction residual related to the luminance TU that is split and a quantized prediction residual related to the chrominance TU that is not split.

Block Split Method

Figure 11:
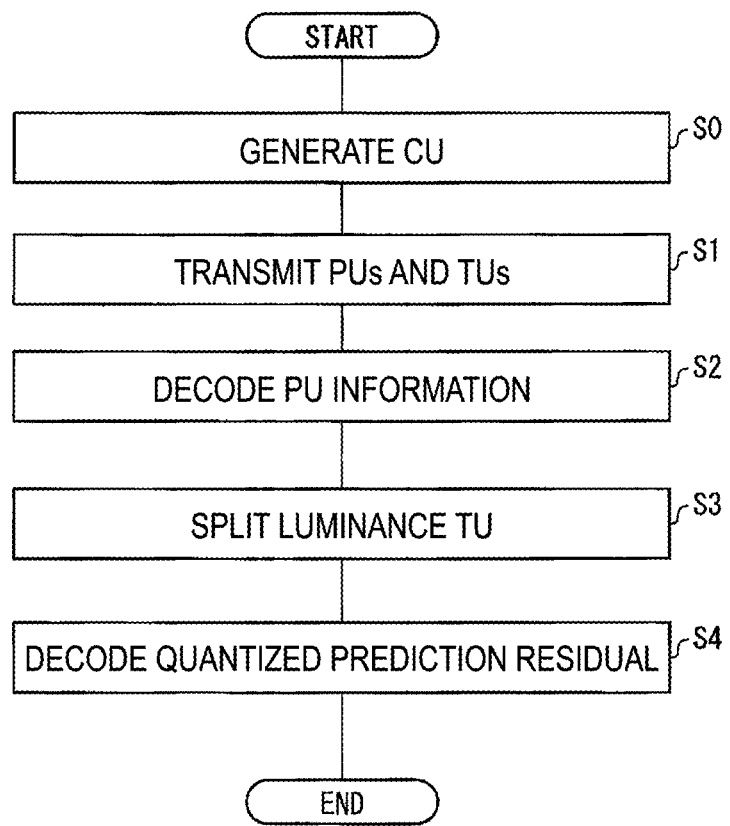
FIG. 11 is a flowchart for describing an example of a block split method used by an image decoding device 31 according to Embodiment 1 of the present invention.

A block split method used by the image decoding device 31 according to the present embodiment will be described in detail with reference to FIG. 11. FIG. 11 is a flowchart for describing an example of a block split method used by the image decoding device 31 according to the present embodiment.

First, in Step S0, the CN information decoding unit 10 decodes, from CN information included in a CN, a QT split flag indicating whether or not a target CN is to be split by QT split. Then, the CN information decoding unit 10 recursively splits and decodes the target CN until the QT split flag stops notifying the CN information decoding unit 10 of further split. After the QT split flag stops notifying the CN information decoding unit 10 of further split, the CN information decoding unit 10 transmits the target CN as a CU ("coding unit" in Claims) to the CU decoding unit 20.

Next, the CU decoding unit 20 transmits PUs ("prediction unit" in Claims) included in the CU received from the CN information decoding unit 10 to the PU information decoding unit 12, and transmits TUs ("transform unit" in Claims) included in the CU to the TT information decoding unit 13 (Step S1).

Next, the PU information decoding unit 12 decodes PU information of the PUs received from the CU decoding unit 20 (Step S2). The PU information decoding unit 12 may further decode information indicating whether or not the PUs are to be split, and may split the PUs.

Among the TUs received from the CU decoding unit 20, the TT information decoding unit 13 splits a luminance TU, and does not split a chrominance TU (Step S3). Examples of a method in which the TT information decoding unit 13 determines that the TT information decoding unit 13 is to split a luminance TU and is not to split a chrominance TU include a method of using a split flag indicating that a luminance TU is to be split and a chrominance TU is not to be split, or a luminance TU and a chrominance TU are not to be split.

Next, the TU decoding unit 22 decodes a quantized prediction residual of the luminance TU generated by the TT information decoding unit 13 through the split, and decodes a quantized prediction residual of the chrominance TU that is not split by the TT information decoding unit 13 (Step S4).

Note that, although illustration is omitted in FIG. 11, the prediction image generation unit 308 ("prediction image generation unit" in Claims) generates a prediction image, based on the PU information decoded by the PU information decoding unit 12 in Step S2. The inverse quantization and inverse transformer unit 311 ("transform coefficient decoding unit" in Claims) calculates a transform coefficient corresponding to luminance and a transform coefficient corresponding to chrominance, based on the quantized prediction residuals decoded by the TU decoding unit 22 in Step S4.

Specific Example of Block Split Method

Figure 12:
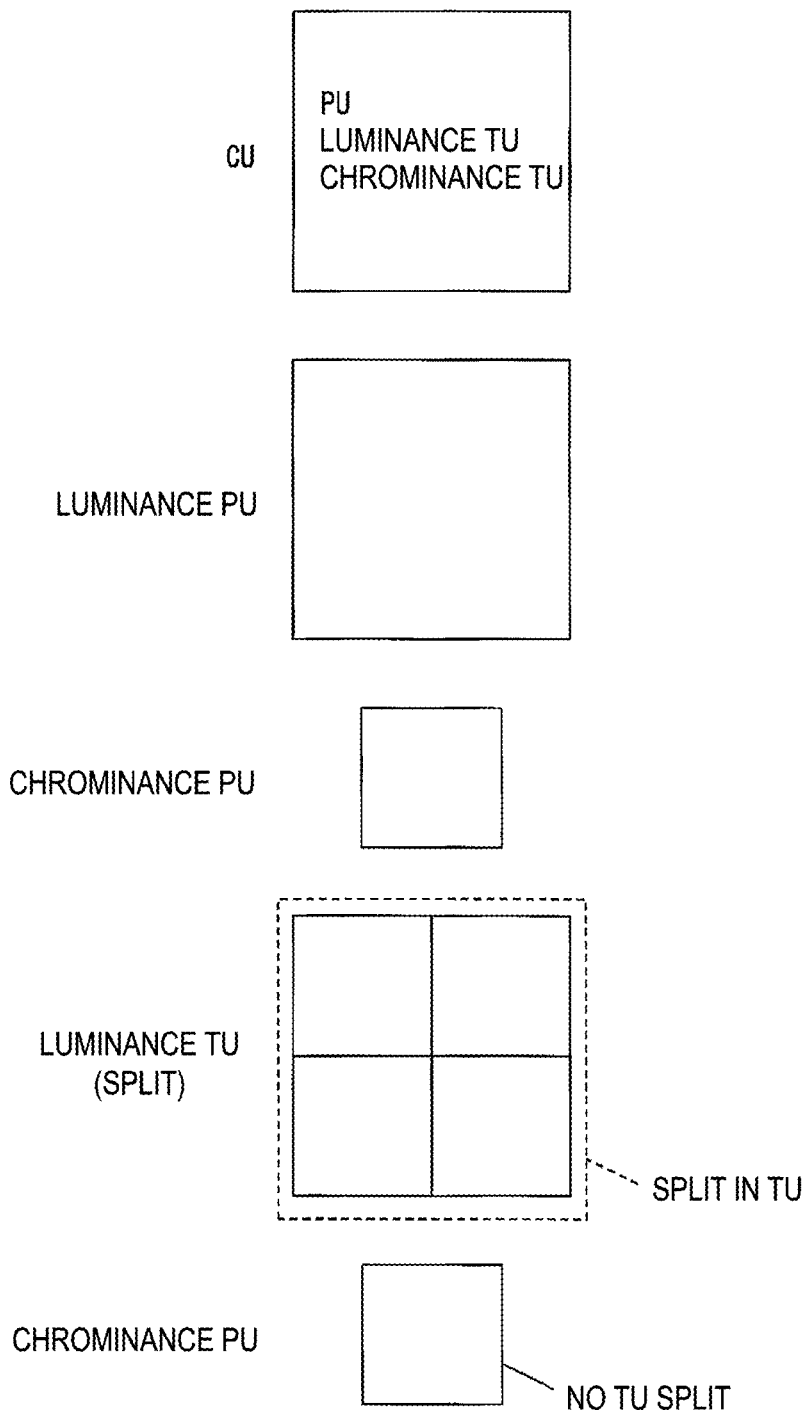
FIG. 12 is a diagram for describing a block split method according to Embodiment 1 of the present invention.

A specific example of the block split method used by the image decoding device 31 according to the present embodiment will be described below in detail with reference to FIG. 12, equations, and the like. FIG. 12 is a diagram for describing a block split method according to the present embodiment. As illustrated in FIG. 12, in the block split method according to the present embodiment, a CU is not split, and only a luminance TU included in the CU is split. Note that the following describes a specific example using a QT split, but a BT split or a TT split may be used instead.

First, in Step S0 described above, as illustrated in Formula (1) below, the CN information decoding unit 10 decodes a QT split flag (split_cu_flag) for each coding node CN. In a case that split_cu_flag indicates further split (here, other than 0), the CN information decoding unit 10 recursively splits and decodes the target CN. As illustrated in Formula (1) below, after the QT split flag (split_cu_flag) stops notifying the CN information decoding unit 10 of further split (here, split_cu_flag=0), the CN information decoding unit 10 processes the target CN as a CU in the CU decoding unit 20.

```
coding_tree (x, y, w, h)
{
    split_cu_flag decoding (coding)
    if (spit_cu_flag) {
        x0 = x, y0 = y, x1 = x0 + (w >> 1), y1 = y0 + (h >> 1)
        coding_tree (x0, y0, w >> 1, h >> 1)
        coding_tree (x1, y0, w >> 1, h >> 1)
        coding_tree (x0, y1, w >> 1, h >> 1)
        coding_tree (x1, y1, w >> 1, h >> 1)
    }
    else {
        coding_unit (x, y, w, h)
    }
} ... Formula (1)
```

In Formula (1) above, coding_tree represents a coding node CN, x, y represents top left coordinates of a target CN, and w, h represents the size of a target CN. >> represents a right bit shift. In the above example, in a case that split_cu_flag is decoded and the decoded split_cu_flag is 1, a lower CN is decoded (split), and in a case that split_cu_flag is 0, coding_unit (CU) is decoded.

Note that, as illustrated in Formula (2) below, coding_unit (CU) in Formula (1) above includes prediction_unit (PU) and transform_unit (TU).

```
coding_unit (x, y, w, h)
{
    prediction_unit (x, y, w, h)
    transform_unit (x, y, w, h)
} ... Formula (2)
        As illustrated in Formula (3) below, transform_unit (TU) in Formula (2) above
includes transform_luma (luminance TU) and transform_chroma (chrominance TU). As
illustrated in Formula (4) below, transform_unit (TU) may include three items of
residual_coding (quantized prediction residuals).
transform_unit (x, y, w, h)
{
    transform_luma (x, y, w, h)
    transform_chroma (x, y, w, h)
} ... Formula (3)
transform_unit ( )
{
    residual_coding (x, y, w, h, cIdx = 0)
    residual_coding (x, y, w, h, cIdx = 1)
    residual_coding (x, y, w, h, cIdx = 2)
} ... Formula (4)
```

In Formula (4) above, cIdx represents a color component, residual_coding with cIdx=0 indicates that residual_coding is a quantized prediction residual related to luminance (luma), residual_coding with cIdx=1 indicates that residual_coding is a quantized prediction residual related to a first chrominance component (Cb), and residual_coding with cIdx=2 indicates that residual_coding is a quantized prediction residual related to a second chrominance component (Cr).

As illustrated in Formula (5) below, in a case that the TT information decoding unit 13 refers to a split flag (split_luma_flag) indicating whether or not a luminance TU is to be split and the split flag indicates split in Step S3, the TT information decoding unit 13 splits the luminance TU, and the TU decoding unit 22 decodes a quantized prediction residual corresponding to the luminance in Step S4. In a case that the split flag does not indicate split, the TT information decoding unit 13 does not split the luminance TU, and the TU decoding unit 22 decodes (performs inverse quantization and inverse transform on) a quantized prediction residual corresponding to the luminance in Step S4.

```
transform_luma (x, y, w, h)
{
    split_luma_flag
    if (split_luma_flag) {
        x0 = x, y0 = y, x1 = x0 + (w >> 1), y1 = y0 + (h >> 1)
        transform_luma (x0, y0, w >> 1, h >> 1)
        transform_luma (x1, y0, w >> 1, h >> 1)
        transform_luma (x0, y1, w >> 1, h >> 1)
        transform_luma (x1, y1, w >> 1, h >> 1)
    }
    else {
        residual_coding (x, y, w, h, cIdx = 0)
    }
} ... Formula (5)
```

Meanwhile, regarding the chrominance TU, in Step S3, the TT information decoding unit 13 does not split the chrominance TU, and the TU decoding unit 22 decodes (performs inverse quantization and inverse transform on) quantized prediction residuals corresponding to the chrominance illustrated in Formula (6) below.

```
transform_chroma (x, y, w, h)
{
    residual_coding (x, y, w, h, cIdx = 1)
    residual_coding (x, y, w, h, cIdx = 2)
} ... Formula (6)
```

Gist of Embodiment 1

As described above, in a transform tree, the image decoding device 31 according to the present embodiment splits a transform unit (TU) corresponding to luminance and then decodes a transform coefficient corresponding to the luminance, and does not split a transform unit (TU) corresponding to chrominance and decodes a transform coefficient corresponding to the chrominance.

According to the configuration described above, a transform unit corresponding to chrominance is not split, and therefore concentration of residual energy corresponding to chrominance can be maintained. Accordingly, decoding of residuals can be efficiently performed, and a code amount can be reduced.

Embodiment 2

Embodiment 2 of the present invention is described as follows, with reference to the drawings. Note that, also in the present embodiment, the image decoding device 31 according to Embodiment 1 will be used. Thus, members having the same functions as the members included in the image decoding device 31 described in Embodiment 1 are denoted by the same reference signs, and descriptions thereof will be omitted.

Block Split Method

Figure 13:
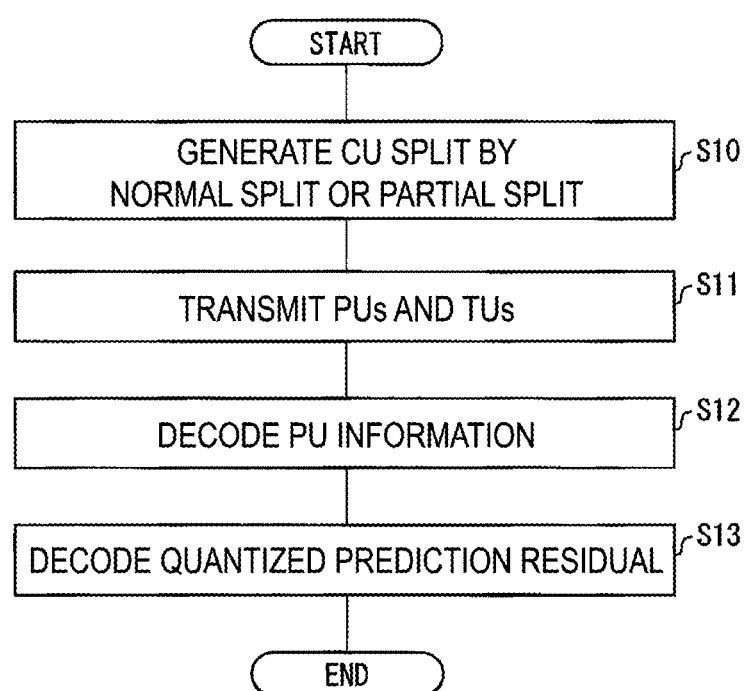
FIG. 13 is a flowchart for describing an example of a block split method used by an image decoding device 31 according to Embodiment 2 of the present invention.

A block split method used by the image decoding device 31 according to the present embodiment will be described in detail with reference to FIG. 13. FIG. 13 is a flowchart for describing an example of a block split method used by the image decoding device 31 according to the present embodiment. Note that description of steps similar to the steps described in Embodiment 1 will be omitted.

First, in Step S10, the CN information decoding unit 10 decodes, from CN information included in a CN, a split flag indicating whether or not a target CN is to be split. Then, the CN information decoding unit 10 recursively QT-splits and decodes the target CN until the split flag stops notifying the CN information decoding unit 10 of further split. After the split flag stops notifying the CN information decoding unit 10 of further split, the CN information decoding unit 10 transmits a target CN subjected to partial split as a CU to the CU decoding unit 20.

Note that splits in Embodiment 2 include two types, specifically, normal split and partial split. The normal split is the same as the split described in Embodiment 1, and thus description thereof will be omitted. The partial split is such split that coding and decoding processing is performed for PU information and a quantized prediction residual of luminance in each CU of multiple split CUs, whereas transform and quantization or inverse quantization and inverse transform is performed for quantized prediction residuals of chrominance collectively in multiple split CUs so that coded data is located in the first CU. Note that normal split and partial split are switched according to the conditions to be described later.

As a step subsequent to Step S10, the CU decoding unit 20 transmits PUs included in the CU received from the CN information decoding unit 10 to the PU information decoding unit 12, and transmits TUs included in the CU to the TU decoding unit 22 (Step S11).

Next, the PU information decoding unit 12 decodes PU information of the PUs in each CU received from the CU decoding unit 20 (Step S12).

Next, the TU decoding unit 22 decodes a quantized prediction residual of a luminance TU in each CU received from the CU decoding unit 20, and decodes quantized prediction residuals of a chrominance TU stored in the first CU received from the CU decoding unit 20 (Step S13).

Specific Example of Block Split Method

Figure 14:
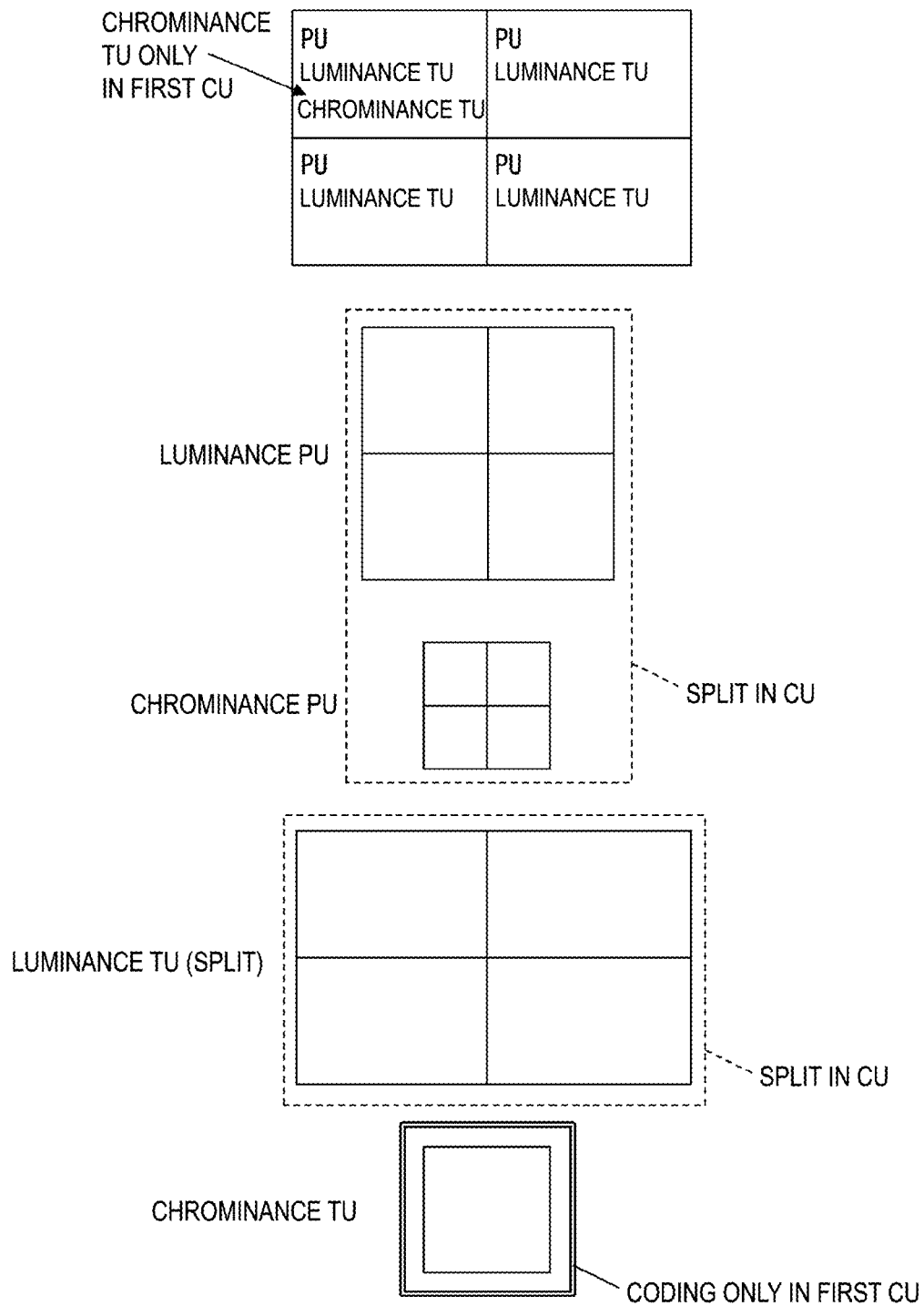
FIG. 14 is a diagram for describing a block split method according to Embodiment 2 of the present invention.

A specific example of the block split method used by the image decoding device 31 according to the present embodiment will be described in detail below with reference to FIG. 14, equations, and the like. FIG. 14 is a diagram for describing a partial split method according to the present embodiment. As illustrated in FIG. 14, in the partial split method according to the present embodiment, by using CUs subjected to partial split, a PU and a luminance TU are obtained in each CU, and a chrominance TU is obtained in the first CU.

First, in Step S10 described above, as illustrated in Formula (7) below, the CN information decoding unit 10 decodes a split flag (split_cu_flag) in a target CN (coding_tree), and then recursively QT-splits and decodes the target CN until the split flag split_cu_flag stops notifying the CN information decoding unit 10 of further split (in a case that split_cu_flag=1). After the split flag split_cu_flag stops notifying the CN information decoding unit 10 of further split (split_cu_flag=0), the CN information decoding unit 10 decodes a CU (coding_unit) of the target CN in the CU decoding unit 20.

```
coding_tree (x, y, w, h, xc, yc, wc, hc)
{
    split_cu_flag
    if (split_cu_flag) {
        x0 = x, y0 = y, x1 = x0 + (w >> 1), y1 = y0 + (h >> 1)
        if (normal CU split determination) { // normal split
            coding_tree (x0, y0, w >> 1, h >> 1, x0, y0, w >> 1,
                h >> 1)
            coding_tree (x1, y0, w >> 1, h >> 1, x1, y0, w >> 1,
                h >> 1)
            coding_tree (x0, y1, w >> 1, h >> 1, x0, y1, w >> 1,
                h >> 1)
            coding_tree (x1, y1, w >> 1, h >> 1, x1, y1, w >> 1,
                h >> 1)
        } else { // partial split
            coding_tree (x0, y0, w >> 1, h >> 1, xc, yc, wc, hc)
            coding_tree (x1, y0, w >> 1, h >> 1, xc, yc, wc, hc)
            coding_tree (x0, y1, w >> 1, h >> 1, xc, yc, wc, hc)
            coding_tree (x1, y1, w >> 1, h >> 1, xc, yc, wc, hc)
        }
    }
    else {
        coding_unit (x, y, w, h, xc, yc, wc, hc)
    }
} ... Formula (7)
```

In Embodiment 2, in a case that split is notified by the split flag (in a case that split_cu_flag=1), normal split and partial split are switched according to the conditions to be described later (described as "normal CU split determination" in Formula (7)). Note that processing of normal split is the same as that in Embodiment 1, and thus description thereof will be omitted.

In Formula (7) above, inside ( . . . ) of coding_tree ( . . . ), in order from left, (x, y) represents top left coordinates of a CN, (w, h) represents the size thereof, (xc, yc) represents top left coordinates of a chrominance quantized prediction residual block, and (wc, hc) represents the size thereof.

Note that the coordinates and the size of chrominance with respect to luminance vary depending on chrominance formats (4:2:0, 4:2:2, 4:4:4, etc.). In the following, however, for the sake of simple description, values of the coordinates and the size of chrominance converted into values for luminance will be used. In other words, values converted into values of a coordinate system the same as the coordinate system of luminance will be used. For example, it is assumed that the coordinates and the size of chrominance respectively corresponding to the coordinates (x, y) and the size (w, h) of luminance are (xk, yk) and (wk, hk). In a case of 4:2:0, (xk, yk)=(x>>1, y>>1) and (wk, hk)=(w>>1, h>>1). In a case of 4:2:2, (xk, yk)=(x>>1, y) and (wk, hk)=(w>>1, h). In a case of 4:4:4, (xk, yk)=(x, y) and (wk, hk)=(w, h). In the following, however, the chrominance coordinates (xk, yk) and the chrominance size (wk, hk) will not be used. In other words, the coordinates and the size of chrominance are regarded as (xc, yc)=(x, y) and (wc, hc)=(w, h), irrespective of the chrominance formats. Thus, in actual processing, to obtain coordinates (xk, yk) and a size (wk, hk) of an actual chrominance block, the following conversion needs to be performed.

$$xk=xc>>1, yk=yc>>1, wk=wc>>1, hk=hc>>1 \text{ (in a case of 4:2:0)}$$

$$xk=xc>>1, wk=wc>>1 \text{ (in a case of 4:2:2)}.$$

As illustrated in Formula (7) above, in a case that the split flag (split_cu_flag) notifies the CN information decoding unit 10 of further split and the normal split condition is not satisfied, the CN information decoding unit 10 performs partial split.

More specifically, in Formula (7) above, in a case of partial split, at the time of decoding the target CN (coding_tree), the CN information decoding unit 10 performs processing by substituting the same values as top left coordinates (xc, yc) and a size (wc, hc) of a higher CN (values passed as arguments) respectively for the top left coordinates (xc, yc) and the size (wc, hc) of the quantized prediction residual block of chrominance.

As illustrated in Formula (8) below, coding_unit (x, y, w, h, xc, yc, wc, hc) being a CN in Formula (7) above includes prediction_unit (x, y, w, h) being a PU and transform_unit (x, y, w, h, xc, yc, wc, hc) being a TU.

```
Coding_unit (x, y, w, h, xc, yc, wc, hc)
{
    prediction_unit (x, y, w, h)
    transform_unit (x, y, w, h, xc, yc, wc, hc)
} ... Formula (8)
```

Then, as illustrated in Formula (9) below, in Step S13, the TU decoding unit 22 decodes (performs inverse quantization and inverse transform on) a quantized prediction residual related to luminance (residual_coding (x, y, w, h, cIdx=0)), and decodes (performs inverse quantization and inverse transform on) quantized prediction residuals related to chrominance (residual_coding (xc, yc, wc, hc, cIdx=1) and residual_coding (xc, yc, wc, hc, cIdx=2)) (Step S13).

```
transform_unit (x, y, w, h, xc, yc, wc, hc)
{
    residual_coding (x, y, w, h, cIdx = 0)
    if (x == xc && y == yc) {
        residual_coding (xc, yc, wc, hc, cIdx = 1)
        residual_coding (xc, yc, wc, hc, cIdx = 2)
    }
} ... Formula (9)
```

In Formula (9) above, the TU decoding unit 22 performs a determination relation (if (x==xc && y==yc)). By the determination relation, i.e., coordinates (x, y) of a target CU and coordinates of a target TU of chrominance are the same, i.e., the TU decoding unit 22 performs decoding processing residual_coding of quantized prediction residuals of chrominances Cb and Cr of a CU located at the top left.

As illustrated in normal split of Formula (7), in a case of normal split, the same values are substituted for the coordinates (x, y) of the target CU and the coordinates (xc, yc) of the target TU of chrominance, and decoding processing of the quantized prediction residuals of the chrominances Cb and Cr is performed. However, as illustrated in partial split of Formula (7), in a case of partial split, for the coordinates (x, y) of the target CU and the coordinates (xc, yc) of the target TU of chrominance, the same values are substituted only in the first CU out of the first four split CUs obtained at the start of partial split. Thus, decoding processing of the quantized prediction residuals of the chrominances Cb and Cr is performed only in the first CU.

Figure 15:
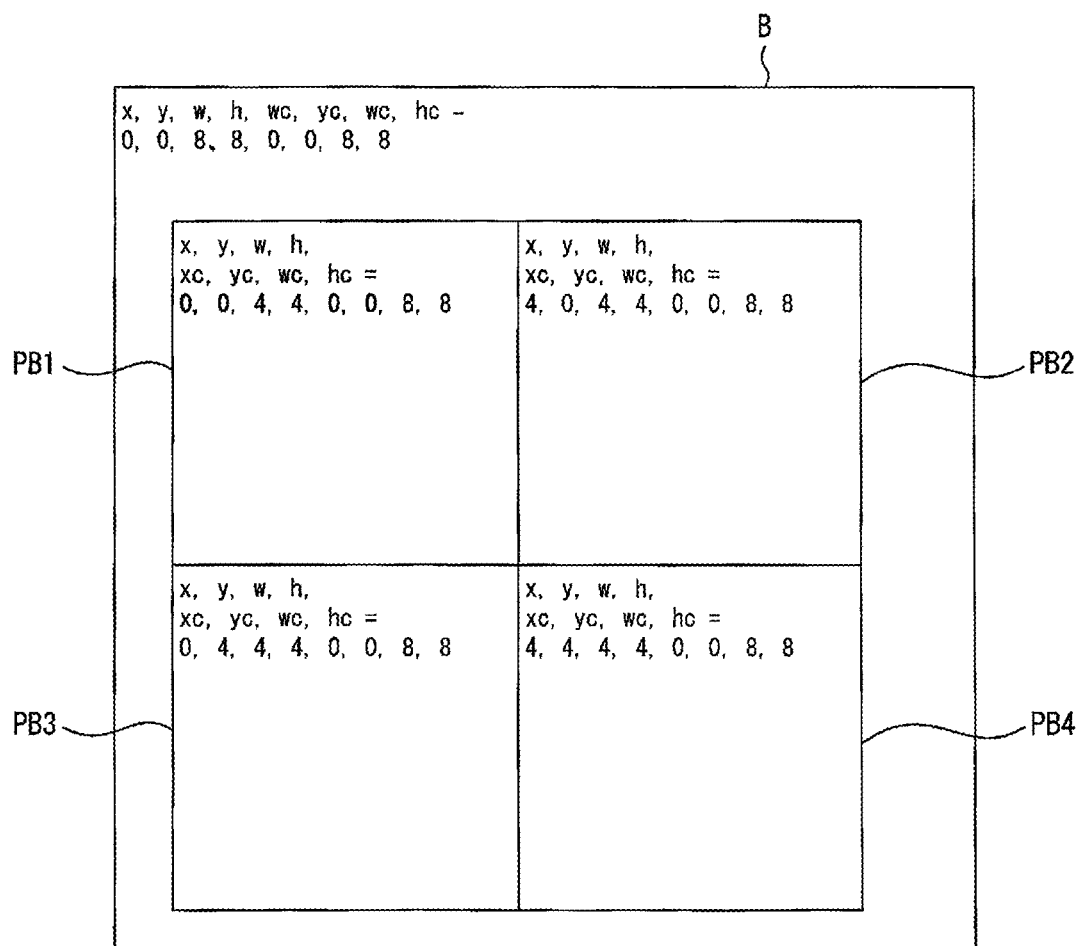
FIG. 15 is a diagram for describing partial split according to Embodiment 2 of the present invention.

The determination relation (if (x==xc && y==yc)) in Formula (9) above will be described with reference to FIG. 15 and FIG. 16. Both are examples in which partial split is started in block B. In other words, both are examples in which partial split is performed in block B and lower levels of hierarchy. FIG. 15 illustrates a CN (block B) which is not split by partial split, and CNs (blocks PB$_1$ to PB$_4$) obtained by further splitting the block B by partial split. Note that the blocks PB$_1$ to PB$_4$ of FIG. 15 are not split anymore.

Figure 16:
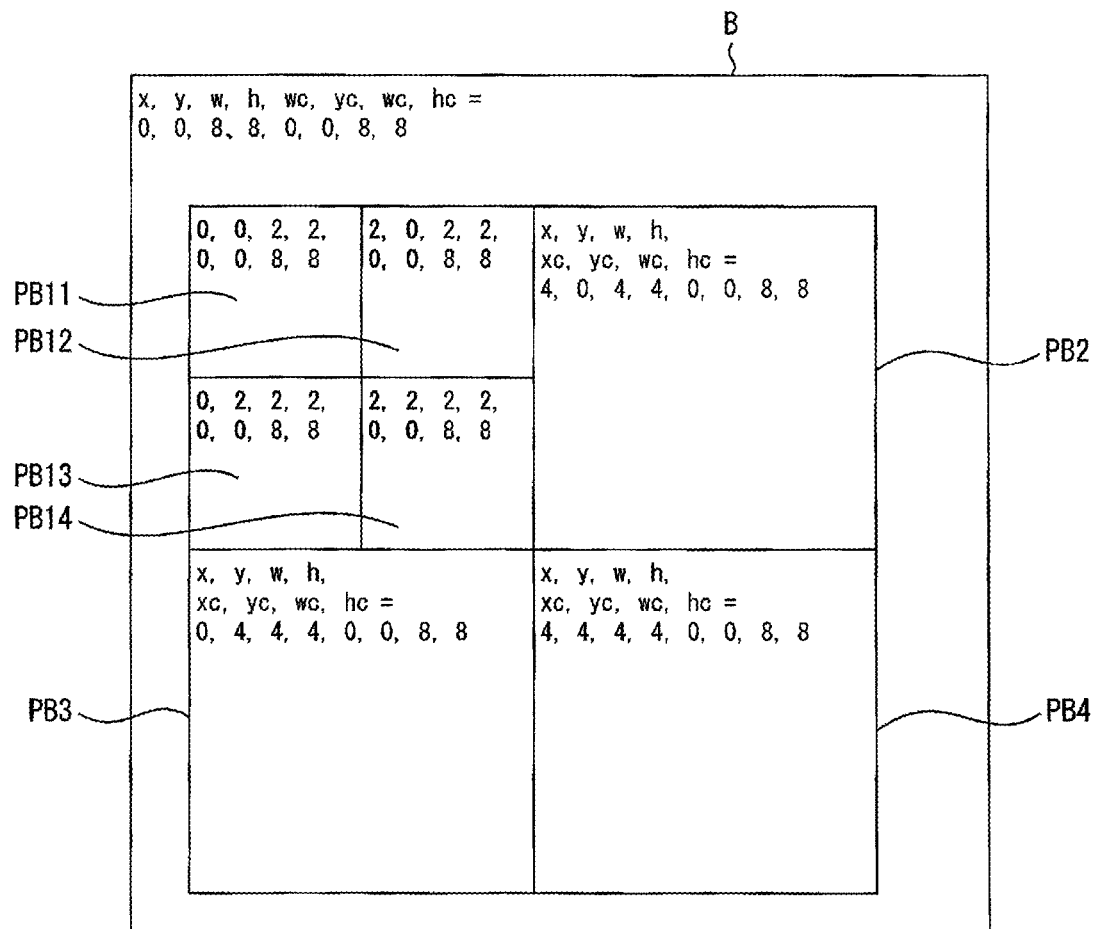
FIG. 16 is a diagram for describing the partial split according to Embodiment 2 of the present invention.

FIG. 16 is an example different from FIG. 15, and illustrates an example with blocks PB$_{11}$ to PB$_{14}$, which are generated as a result of further partial split performed on the block PB$_1$ that is the first CN of the blocks PB$_1$ to PB$_4$ obtained by partial split, in the block illustrated in FIG. 15. Note that the blocks PB$_{11}$ to PB$_{14}$ of FIG. 16 are not split anymore. PB$_2$ to PB$_4$ are not split anymore either.

As illustrated in FIG. 15, the coordinates and the size of the block B (non-shared block) not subjected to partial split are (x, y, w, h, xc, yc, wc, hc=0, 0, 8, 8, 0, 0, 8, 8), and satisfy x==xc && y==yc. The first block PB$_1$ (shared block) subjected to partial split is (x, y, w, h, xc, yc, wc, hc=0, 0, 4, 4, 0, 0, 8, 8), and satisfy x==xc && y==yc. Therefore, in Step S13, as determination results based on the determination relation in Formula (9) above, the TU decoding unit 22 decodes quantized prediction residuals related to chrominance of the entire block B. Specifically, in the first block PB$_1$ of the block B, the quantized prediction residuals, residual_coding (xc, yc, wc, hc, cIdx=1) and residual_coding (xc, yc, wc, hc, cIdx=2), of the coordinates and the size of the block B (xc, yc, wc, hc)=(0, 0, 8, 8) are decoded. However, in the blocks PB$_2$ to PB$_4$ other than the first block subjected to partial split, x==xc && y==yc is not satisfied, and therefore the quantized prediction residuals related to chrominance are not decoded.

As illustrated in FIG. 16, the coordinates and the size of the block PB$_{11}$ being the first CU (leaf) of the blocks PB$_{11}$ to PB$_{14}$ are (x, y, w, h, xc, yc, wc, hc=0, 0, 2, 2, 0, 0, 8, 8), and satisfy x==xc && y==yc. Therefore, in Step S13, as determination results based on the determination relation in Formula (9) above, in the block $PB_{11}$, the TU decoding unit 22 decodes quantized prediction residuals related to chrominance of the entire block B. However, in the blocks $PB_{12}$ to $PB_{14}$ and the $PB_2$ to $PB_4$ other than the first block subjected to partial split, x==xc && y==yc is not satisfied, and therefore the quantized prediction residuals related to chrominance are not decoded.

Modified Example 1 of Embodiment 2

Figure 17:
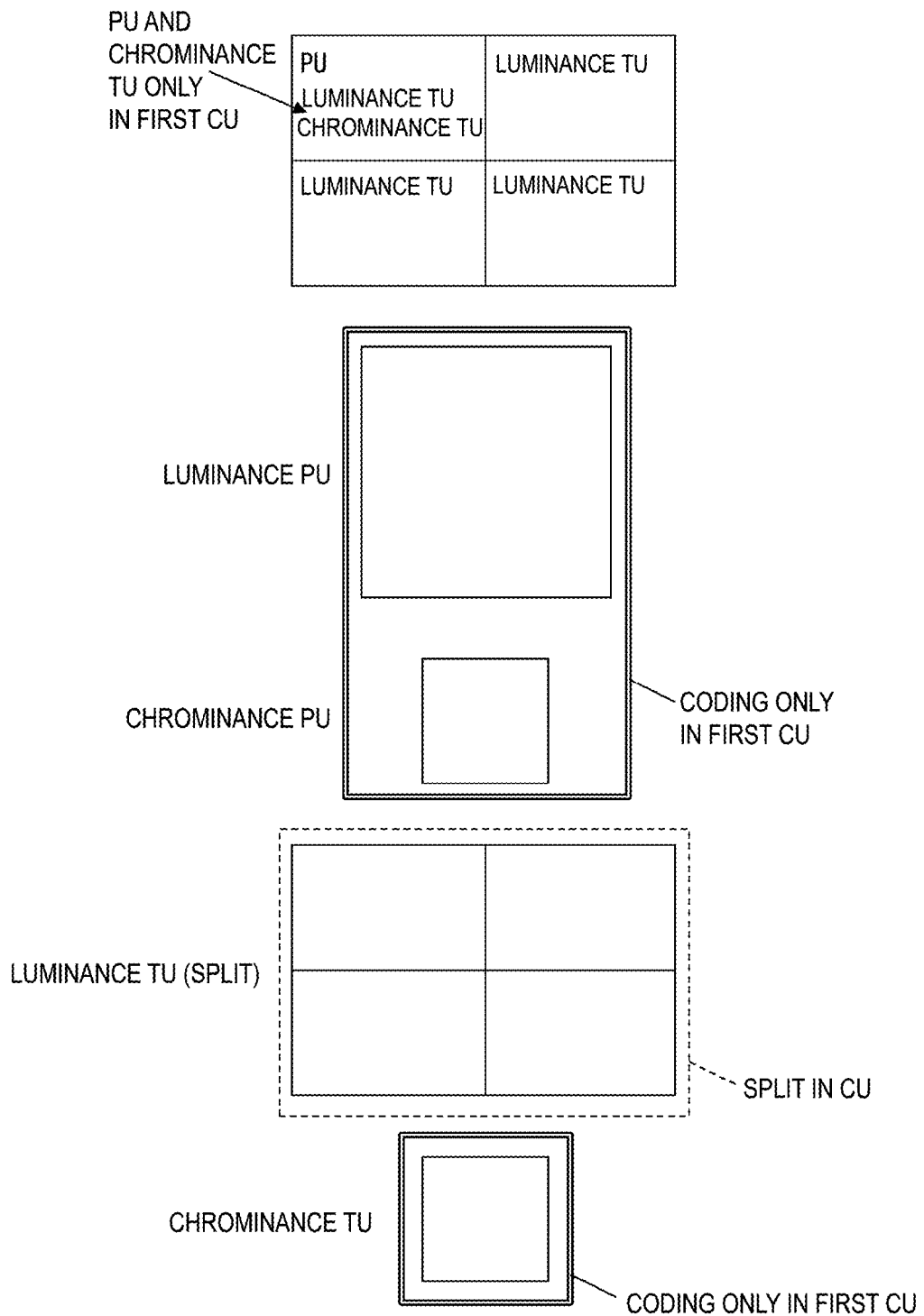
FIG. 17 is a diagram for describing a block split method according to a modified example of Embodiment 2 of the present invention.

Modified Example 1 of Embodiment 2 will be described below with reference to FIG. 17. FIG. 17 is a diagram for describing a block split method according to the present modified example. As illustrated in FIG. 17, in the block split method according to the present modified example, by using CUs subjected to partial split, a luminance TU is obtained in each CU, and a PU and a chrominance TU are obtained in the first CU.

In Step S12 of the block split method described above, the PU information decoding unit 12 decodes PU information related to a PU in each CU, and in Step S13, the TU decoding unit 22 decodes a quantized prediction residual of a luminance TU, and decodes quantized prediction residuals of a chrominance TU in the first CU. However, in the present modified example, the PU information decoding unit 12 decodes PU information included in a specific CU. Therefore, the PU information decoding unit 12 decodes PU information related to a PU in the first CU, and the TU decoding unit 22 decodes quantized prediction residuals of a chrominance TU, and decodes a quantized prediction residual of a luminance TU in each CU.

For example, as illustrated in Formula (10) below, the PU information decoding unit 12 determines whether or not a CU is the first CU, and decodes only PU information included in the first CU.

```
coding_unit (x, y, w, h, xc, yc, wc, hc)
{
    if (x == xc && y == yc)
        prediction_unit (x, y, w, h)
    transform_unit (x, y, w, h, xc, yc, wc, hc)
} ... Formula (10)
```

As illustrated in Formula (10) above, the PU information decoding unit 12 decodes PU information included in the CU (first CU) that satisfies the condition of (x==xc && y==yc). Note that, regarding the TU, the same method as that described in the above section (Specific Example of Block Split Method) applies, and thus description thereof will be omitted. In this manner, the PU information decoding unit 12 or the TU decoding unit 22 can decode a PU and a chrominance TU in the first CU, and can decode a luminance TU in each CU.

Modified Example 2 of Embodiment 2

Modified Example 2 of Embodiment 2 will be described below in detail. In the present modified example, as illustrated in Formula (11) below, in Step S10 described above, the CN information decoding unit 10 uses a temporary variable flag (signaling_flag) indicating whether or not partial split is to be performed (quantized prediction residuals of chrominance are to be coded or decoded in each CU).

```
coding_tree (x, y, w, h, xc, yc, wc, hc, signaling_flag)
{
    split_cu_flag
    if (split_cu_flag) {
        x0 = x, y0 = y, x1 = x0 + (w >> 1), y1 = y0 + (h >> 1)
        if (normal CU split determination) { // normal split
            coding_tree (x0, y0, w >> 1, h >> 1, x0, y0, w >> 1,
                h >> 1, 1)
            coding_tree (x1, y0, w >> 1, h >> 1, x1, y0, w >> 1,
                h >> 1, 1)
            coding_tree (x0, y1, w >> 1, h >> 1, x0, y1, w >> 1,
                h >> 1, 1)
            coding_tree (x1, y1, w >> 1, h >> 1, x1, y1, w >> 1,
                h >> 1, 1)
        } else { // partial split
            coding_tree (x0, y0, w >> 1, h >> 1, xc, yc, wc, hc, 1)
            coding_tree (x1, y0, w >> 1, h >> 1, xc, yc, wc, hc,0)
            coding_tree (x0, y1, w >> 1, h >> 1, xc, yc, wc, hc,0)
            coding_tree (x1, y1, w >> 1, h >> 1, xc, yc, wc, hc,0)
        }
    }
    else {
        coding_unit (x, y, w, h, xc, yc, wc, hc, signaling_flag)
    }
} ... Formula (11)
```

Then, the CN information decoding unit 10 transmits a value of signaling_flag and a CU to the CU decoding unit 20. Then, as illustrated in Formula (12) below, coding_unit (x, y, w, h, xc, yc, wc, hc, signaling_flag) in Formula (11) above includes prediction_unit (x, y, w, h) and transform_unit (x, y, w, h, xc, yc, wc, hc, signaling_flag).

```
coding_unit (x, y, w, h, xc, yc, wc, hc, signaling_flag)
{
    prediction_unit (x, y, w, h)
    transform_unit (x, y, w, h, xc, yc, wc, hc, signaling_flag)
} ... Formula (12)
    Then, as illustrated in Formula (13) below, in Step S13, the TU decoding unit 22
decodes a quantized prediction residual related to luminance (residual_coding (x, y, w, h,
cIdx = 0)), and decodes quantized predicion residuals related to chrominance
(residual_coding (xc, yc, wc, hc, cIdx = 1) and residual_coding (xc, yc, wc, hc, c = 2))
(Step S13).
transform_unit (x, y, w, h, xc, yc, wc, hc, signaling_flag)
{
    residual_coding (x, y, w, h, cIdx = 0)
    if (signaling_flag) {
        residual_coding (xc, yc, wc, hc, cIdx = 1)
        residual_coding (xc, yc, wc, hc, cIdx = 2)
    }
} ... Formula (13)
```

In Formula (13) above, the TU decoding unit 22 performs a determination relation (if (signaling_flag)). By the determination relation, the TU decoding unit 22 decodes quantized prediction residuals related to chrominance in a case that signaling_flag indicates 1, and does not decode quantized prediction residuals related to chrominance in a case that signaling_flag indicates 0.

Signaling_flag of the present modified example may be applied to Modified Example 1 described above. In such a case, in Step S12, the PU information decoding unit 12 performs a determination relation (if (signaling_flag)) illustrated in Formula (14) below. In a case that signaling_flag indicates 1, the PU information decoding unit 12 decodes PU information, and in a case that signaling_flag indicates 0, the PU information does not decode PU information. Note that the TU decoding unit 22 in Step S13 performs the same operation as Modified Example 1 described above, and thus description thereof will be omitted.

```
coding_unit (x, y, w, h, xc, yc, wc, hc, signaling_flag)
{
    if (signaling_flag)
        prediction_unit (x, y, w, h)
    transform_unit (x, y, w, h, xc, yc, wc, hc, signaling_flag)
} ... Formula (14)
```

As described above, by using signaling_flag, whether or not to decode a quantized prediction residual, PU information, or the like can be determined without performing determination of coordinate positions.

Modified Example 3 of Embodiment 2

Modified Example 3 of Embodiment 2 will be described below in detail. In the present modified example, in Step S10 described above, the CN information decoding unit 10 determines whether to perform normal split or partial split on a target CN, based on a determination method described below. This determination method relates to the conditions expressed as "normal CU split determination" in Formula (7) and Formula (11). Note that, in Step S10, the CN information decoding unit 10 performs only partial splits after performing partial split once. It is preferable that a target block on which the CN information decoding unit 10 performs partial split be a relatively small block. Determination methods of the following (1) to (3) in consideration of at least one or more of these conditions will be described below.

A flag indicating whether normal split is to be performed is hereinafter referred to as split_mode_flag (luma_chroma_common_split_mode_flag). split_mode_flag being 1 indicates normal split, and split_mode_flag being 0 indicates partial split. Alternatively, partial_split_mode_flag, which includes opposite meaning of split_mode_flag, may be used. In a case that partial_split_mode_flag indicates 0, normal split is performed on a target CN. In a case that decoded partial_split_mode_flag indicates 1, partial split is performed. Note that luminance and chrominance have common structures in normal split, and thus split_mode_flag may be referred to as luma_chroma_common_split_mode_flag. Luminance and chrominance have different structures in partial split, and furthermore, blocks are merged in chrominance, and thus partial_split_mode_flag may be referred to as chroma_shared_split_mode_flag.

After partial split is performed once, at least any of {x, y, w, h} and {xc, yc, wc, hc} varies. Thus, in a case that only partial splits are performed after partial split is performed, Formula (15) below holds. In other words, as in Formula (15) below, values of split_mode_flag (partial_split_mode_flag) can be configured.

if $(x!=xc \| y!=yc \| w!=wc \| h!=hc)$ split_mode_flag=0//partial split or if $(x!=xc \| y!=yc \| w!=wc \| h!=hc)$ partial_split_mode_flag=1//partial split          Formula (15)

Note that w!=wc is equivalent to w<wc, and h!=hc is equivalent to h<hc.

(1) Branch Configuration P1: Size-Dependent Determination

In this determination method, in Step S10, the CN information decoding unit 10 determines whether or not a block size of a target CN is large. As the size of a block size determined by the CN information decoding unit 10, the sum of width w and height h, the product of width w and height h, the sum of a logarithmic value with respect to width log 2 (w) and a logarithmic value with respect to height log 2 (h), or the like can be used. In the following, however, description will be given by using a determination as to whether or not w+h>M is satisfied. Specifically, whether or not w+h>M (M is a threshold indicating the size of a target CN) is satisfied is determined. Then, in a case that the target CN is large (in a case that w+h>M is satisfied), the CN information decoding unit 10 performs normal CU split, and in other cases (in a case that the target CN does not satisfy w+h>M), the CN information decoding unit 10 performs partial split. As an example of M above, M=16 or M=24, for example. In other words, partial_split_mode_flag can be derived based on Formula (16) below.

if $((w+h)>M)$ split_mode_flag=1//normal split else split_mode_flag=0//partial split or if $((w+h)>M)$ partial_split_mode_flag=0//normal split else partial_split_mode_flag=1//partial split          Formula (16)

(2) Branch Configuration P2: Flag Determination

In this determination method, in Step S10, the CN information decoding unit 10 decodes, from coded data, split_mode_flag (luma_chroma_common_split_mode_flag) indicating whether normal split is to be performed or partial split is to be performed. Then, in a case that decoded split_mode_flag indicates 1, the CN information decoding unit 10 performs normal split on the target CN. In a case that decoded split_mode_flag indicates 0, the CN information decoding unit 10 performs partial split. Alternatively, partial_split_mode_flag (chroma_shared_split_mode_flag), which includes opposite meaning of split_mode_flag, may be used. In such a case, in Step S10, in a case that decoded partial_split_mode_flag indicates 0, the CN information decoding unit 10 performs normal split on the target CN. In a case that decoded partial_split_mode_flag indicates 1, the CN information decoding unit 10 performs partial split. In a case that partial split is performed once, a flag need not be decoded, and thus a flag is decoded according to the condition of Formula (17) below.

if ($x==xc$ && $y==yc$ && $w==wc$ && $h==hc$)

split_mode_flag//flag decoding or if ($x==xc$ && $y==yc$ && $w==wc$ && $h==hc$)

partial_split_mode_flag//flag decoding     Formula (17)

(3) Branch Configuration P3: Size-Dependent Flag Determination

In this determination method, in Step S10, first, the CN information decoding unit 10, the CN information decoding unit 10, determines whether or not a block size of a target CN is large. As the size of a block size determined by the CN information decoding unit 10, the sum of width w and height h, the product of width w and height h, the sum of a logarithmic value with respect to width log 2 (w) and a logarithmic value with respect to height log 2 (h), or the like can be used. In the following, however, description will be given by using a determination as to whether or not the sum of width w and height h, i.e., $w+h>M$ is satisfied. Specifically, in a case that the target CN is large (in a case that $w+h>M$ is satisfied), the CN information decoding unit 10 performs normal split. In a case that the target CN is not large ($w+h>M$ is not satisfied) and $x!=xc||y!=yc||w<wc||h<hc$, partial split is already performed, and thus partial split is performed without decoding a flag. In other cases, the CN information decoding unit 10 decodes split_mode_flag or partial_split_mode_flag described above, and performs normal split or partial split, according to a value of the flag. Here, as an example of M above, M=32, for example.

Specifically, the following operation is performed.

if (($w+h$)>$M$)

split_mode_flag=1//normal split else if ($x!=xc||y!=yc||w<wc||h<hc$)

split_mode_flag=0//partial split else split_mode_flag//flag decoding or if (($w+h$)>$M$)

partial_split_mode_flag=0//normal split else if ($x!=xc||y!=yc||w<wc||h<hc$)

partial_split_mode_flag=1//partial split else partial_split_mode_flag//flag decoding     Formula (18)

Note that, in conclusion, the CN information decoding unit 10 decodes a flag only in a case that partial split is not performed, and therefore a flag may be decoded as in Formula (19) below.

if ($x==xc$ && $y==yc$ && $w==wc$ && $h==hc$ && ($w+h$)<=$M$)

partial_split_mode_flag//flag decoding     Formula (19)

In a case that a flag is not decoded, a flag may be derived based on Formula (20) below.

```
if ((w + h) > M)
    partial_split_mode_flag = 0 // normal split
else if (x != xc || y != yc || w < wc || h < hc)
    partial_split_mode_flag = 1 // partial split ... Formula (20)
```

In Formula (21) below, a specific example of the determination method of (3) described above is illustrated.

```
coding_tree (x, y, w, h, xc, yc, wc, hc)
{
    split_cu_flag
    if (split_cu_flag) {
        x0 = x, y0 = y, x1 = x0 + (w >> 1), y1 = y0 + (h >> 1)
        if (x == xc && y == yc && w == wc && h == hc && (w + h) <= M))
            partial_split_mode_flag
        if (!partial_split_mode_flag) { // normal split
            coding_tree (x0, y0, w >> 1, h >> 1, x0, y0, w >> 1, h >> 1)
            coding_tree (x1, y0, w >> 1, h >> 1, x1, y0, w >> 1, h >> 1)
            coding_tree (x0, y1, w >> 1, h >> 1, x0, y1, w >> 1, h >> 1)
            coding_tree (x1, y1, w >> 1, h >> 1, x1, y1, w >> 1, h >> 1)
        } else { // partial split
            coding_tree (x0, y0, w >> 1, h >> 1, xc, yc, wc, hc)
            coding_tree (x1, y0, w >> 1, h >> 1, xc, yc, wc, hc)
            coding_tree (x0, y1, w >> 1, h >> 1, xc, yc, wc, hc)
            coding_tree (x1, y1, w >> 1, h >> 1, xc, yc, wc, hc)
        }
    }
    else {
        coding_unit (x, y, w, h, xc, yc, wc, hc)
    }
} ... Formula (21)
```

In a case that partial_split_mode_flag is not decoded, partial_split_mode_flag is derived based on Formula (20). As illustrated in Formula (21) above, the CN information decoding unit 10 determines whether or not the block size of the target CN is large (whether or not w+h>M is satisfied) until a split flag (split_cu_flag) stops notifying the CN information decoding unit 10 of further split. Then, in a case that the block size of the target CN is large (in a case that w+h>M is satisfied), the CN information decoding unit 10 performs normal split. Other than that, in a case that partial split is performed (in a case that x!=xc||y!=yc||w<wc||h<hc), the CN information decoding unit 10 performs partial split without decoding a flag. In other cases, split_mode_flag or partial_split_mode_flag described above is decoded, and normal split or partial split is performed according to a value of the flag.

Modified Example 4 of Embodiment 2

Each of the above modified examples describes an example in which a target CN is subjected to QT split. The present modified example describes an example including BT split of a target CN.

As illustrated in Formula (22) below, the CN information decoding unit 10 performs the process illustrated in Formula (21) in Modified Example 3 described above. Then, in a case that split_cu_flag indicates 0 and partial split is not performed in QT split, the CN information decoding unit 10 decodes split_bt_flag, which is a flag indicating whether or not BT split is to be performed on a target CN.

```
coding_tree (x, y, w, h, xc, yc, wc, hc)
{
    split_cu_flag
    if (spit_cu_flag) {
        x0 = x, y0 = y, x1 = x0 + (w >> 1), y1 = y0 + (h >> 1)
        if (x == xc && y == yc && w == wc && h == hc && (w + h) <= M)
            partial_split_mode_flag
            if (!partial_split_mode_flag) { // normal split
                coding_tree (x0, y0, w >> 1, h >> 1, x0, y0, w >> 1, h >> 1)
                coding_tree (x1, y0, w >> 1, h >> 1, x1, y0, w >> 1, h >> 1)
                coding_tree (x0, y1, w >> 1, h >> 1, x0, y1, w >> 1, h >> 1)
                coding_tree (x1, y1, w >> 1, h >> 1, x1, y1, w >> 1, h >> 1)
            } else { // partial split
                coding_tree (x0, y0, w >> 1, h >> 1, xc, yc, wc, hc)
                coding_tree (x1, y0, w >> 1, h >> 1, xc, yc, wc, hc)
                coding_tree (x0, y1, w >> 1, h >> 1, xc, yc, wc, hc)
                coding_tree (x1, y1, w >> 1, h >> 1, xc, yc, wc, hc)
            }
    }
    else {
        x0 = x, y0 = y, x1 = x0 + (w >> 1), y1 = y0 + (h >> 1)
        if (partial_split_mode_flag)
            split_bt_flag = 0
        else
            split_bt_flag
        if (split_bt_flag) {
            split_dir_flag
            if ((w + h) > M)
                partial_bt_split_mode_flag = 0
            else if (x != xc || y != yc || w < wc || h < hc)
                partial_bt_split_mode_flag = 1
            else
                partial_bt_split_mode_flag
            if (partial_bt_split_mode_flag == 0) { // normal split
                if (split_dir_flag) {
                    coding_tree (x0, y0, w, h >> 1, x0, y0, w, h >> 1)
                    coding_tree (x0, y1, w, h >> 1, x0, y1, w, h >> 1)
                } else {
                    coding_tree (x0, y0, w >> 1, h, x0, y0, w >> 1, h)
                    coding_tree (x1, y0, w >> 1, h, x1, y0, w >> 1, h)
                }
            } else { // partial split
                if (split_dir_flag) {
                    coding_tree (x0, y0, w, h >> 1, xc, yc, wc, hc)
                    coding_tree (x0, y1, w, h >> 1, xc, yc, wc, hc)
                } else {
                    coding_tree (x0, y0, w >> 1, h, xc, yc, wc, hc)
                    coding_tree (x1, y0, w >> 1, h, xc, yc, wc, hc)
                }
            } // partial_bt_split_mode_flag
        } // split_bt_flag
        else {
            coding_unit (x, y, w, h, xc, yc, wc, hc)
        }
    } // split_cu_flag} ... Formula (22)
```

As illustrated in Formula (22) above, in a case that split_bt_flag indicates 1 after split_bt_flag is decoded, the CN information decoding unit 10 decodes split_dir_flag, which is a BT split direction flag. The block size of the target CN is large (in a case that (w+h)>M is satisfied), the CN information decoding unit 10 determines that partial_bt_split_mode_flag=0, and performs normal split. Other than that, in a case that partial split is performed (in a case that x!=xc||y!=yc||w<wc||h<hc), the CN information decoding unit 10 determines that partial_bt_split_mode_flag=1, and performs partial split. In other cases, the CN information decoding unit 10 decodes partial_bt_split_mode_flag described above. Then, in a case that partial_bt_split_mode_flag indicates 0 and split_dir_flag indicates 1, the CN information decoding unit 10 performs normal split on the target CN so that two CNs after the split are aligned along the vertical direction. In a case that partial_bt_split_mode_flag indicates 0 and split_dir_flag indicates 0, the CN information decoding unit 10 performs normal split on the target CN so that two CNs after the split are aligned along the horizontal direction. In a case that partial_bt_split_mode_flag indicates 1 and split_dir_flag indicates 1, the CN information decoding unit 10 performs partial split on the target CN so that two CNs after the split are aligned along the vertical direction. In a case that partial_bt_split_mode_flag indicates 1 and split_dir_flag indicates 0, the CN information decoding unit 10 performs partial split on the target CN so that two CNs after the split are aligned along the horizontal direction.

Note that a QT tree coding_tree and a BT tree coding_bt_tree may be separated, and a configuration as in Formula (23) below may be employed.

```
coding_tree (x, y, w, h, xc, yc, wc, hc)
{
    split_cu_flag
    if (spit_cu_flag) {
        x0 = x, y0 = y, x1 = x0 + (w >> 1), y1 = y0 + (h >> 1)
        if (x == xc && y == yc && w == wc && h == hc && (w + h) <= M)
            partial_split_mode_flag
            if (! partial_split_mode_flag) {
                coding_tree (x0, y0, w >> 1, h >> 1, x0, y0, w >> 1, h >> 1)
                coding_tree (x1, y0, w >> 1, h >> 1, x1, y0, w >> 1, h >> 1)
                coding_tree (x0, y1, w >> 1, h >> 1, x0, y1, w >> 1, h >> 1)
                coding_tree (x1, y1, w >> 1, h >> 1, x1, y1, w >> 1, h >> 1)
            } else { // partial split
                coding_tree (x0, y0, w >> 1, h >> 1, xc, yc, wc, hc)
                coding_tree (x1, y0, w >> 1, h >> 1, xc, yc, wc, hc)
                coding_tree (x0, y1, w >> 1, h >> 1, xc, yc, wc, hc)
                coding_tree (x1, y1, w >> 1, h >> 1, xc, yc, wc, hc)
            }
    }
    else {
        coding_bt_tree (x, y, w, h, xc, yc, wc, hc)
    }
}
coding_bt_tree (x, y, w, h, xc, yc, wc, hc)
    x0 = x, y0 = y, x1 = x0 + (w >> 1), y1 = y0 + (h >> 1)
    split_bt_flag
    if (split_bt_flag) {
        split_dir_flag
        if ((w + h) > M)
            partial_bt_split_mode_flag = 0
        else if (x != xc || y != yc || w < wc || h < hc)
            partial_bt_split_mode_flag = 1
        else
            partial_bt_split_mode_flag
        if (partial_bt_split_mode_flag == 0) { // normal split
            if (split_dir_flag) {
                coding_bt_tree (x0, y0, w, h >> 1, x0, y0, w, h >> 1)
                coding_bt_tree (x0, y1, w, h >> 1, x0, y1, w, h >> 1)
            } else {
                coding_bt_tree (x0, y0, w >> 1, h, x0, y0, w >> 1, h)
                coding_bt_tree (x1, y0, w >> 1, h, x1, y0, w >> 1, h)
            }
        } else { // partial split
            if (split_dir_flag) {
                coding_bt_tree (x0, y0, w, h >> 1, xc, yc, wc, hc)
                coding_bt_tree (x0, y1, w, h >> 1, xc, yc, wc, hc)
            } else {
                coding_bt_tree (x0, y0, w >> 1, h, xc, yc, wc, hc)
                coding_bt_tree (x1, y0, w >> 1, h, xc, yc, wc, hc)
            }
        } // partial_bt_split_mode_flag
    } // split_bt_flag
    else {
        coding unit (x, y, w, h, xc, yc, wc, hc)
    }
} ... Formula (23)
```

Gist of Embodiment 2

As described above, in a similar manner to Embodiment 1, in a transform tree included in a coding unit (CU), the image decoding device 31 according to the present embodiment splits a transform unit (TU) corresponding to luminance and then decodes a transform coefficient related to the luminance, and does not split a transform unit (TU) corresponding to chrominance and decodes a transform coefficient related to the chrominance. In a prediction tree included in the coding unit (CU), the image decoding device 31 does not split a prediction unit (PU) corresponding to luminance and generates a prediction image related to the luminance, and in the prediction tree, the image decoding device 31 does not split a prediction unit (PU) corresponding to chrominance and generates a prediction image related to the chrominance.

According to the configuration described above, only a transform unit corresponding to luminance is split, and therefore concentration of residual energy corresponding to chrominance can be maintained, and an overhead of a code amount can be reduced.

In the prediction tree, by splitting the coding unit (CU), the image decoding device 31 according to the present embodiment may generate the prediction image related to the prediction unit (PU) corresponding to the luminance, and in the prediction tree, by splitting the coding unit (CU), the image decoding device 31 according to the present embodiment may generate the prediction image related to the prediction unit (PU) corresponding to the chrominance.

According to the configuration described above, by splitting a coding unit (CU), transform units (TU) corresponding to luminance can be collectively split. Consequently, split processing of blocks can be simplified.

In a prediction tree included in the coding unit (CU), the image decoding device 31 according to the present embodiment may not split a prediction unit corresponding to luminance and may generate a prediction image related to the luminance, and may not split a prediction unit corresponding to chrominance and may generate a prediction image related to the chrominance.

According to the configuration described above, a prediction unit is not split, and therefore a code amount can be reduced.

Embodiment 3

Embodiment 3 of the present invention is described as follows, with reference to the drawings. Note that, also in the present embodiment, the image decoding device 31 according to Embodiment 1 will be used. Thus, members having the same functions as the members included in the image decoding device 31 described in Embodiment 1 are denoted by the same reference signs, and descriptions thereof will be omitted.

In Embodiment 1 and Embodiment 2 described above, processing related to a PU is performed as in the following manner. First, the PU information decoding unit 12 decodes PU information of each PU. Next, the inter prediction parameter decoding unit 303 decodes an inter prediction parameter with reference to a prediction parameter stored in the prediction parameter memory 307, based on the PU information, and then outputs the decoded inter prediction parameter to the prediction image generation unit 308. Meanwhile, the intra prediction parameter decoding unit 304 decodes an intra prediction parameter with reference to a prediction parameter stored in the prediction parameter memory 307, based on the PU information. Then, the prediction image generation unit 308 generates a prediction image of a PU or a subblock by using a prediction parameter and a read reference picture (reference picture block), with a prediction mode indicated by a prediction mode predMode included in the PU information. More specifically, in a case that the prediction mode predMode indicates an inter prediction mode, the inter prediction image generation unit 309 generates a prediction image of a PU or a subblock by an inter prediction with the use of an inter prediction parameter and a read reference picture (reference picture block). In a case that the prediction mode predMode indicates an intra prediction mode, the intra prediction image generation unit 310 generates a prediction image of a PU by an intra prediction with the use of an intra prediction parameter and a read reference picture.

Such processing related to a PU as described above includes the following problems. First, in the generation of a prediction image, the same prediction as the prediction for luminance may not be effective in the prediction for chrominance. If the technique of using different trees for luminance and chrominance is applied to an inter prediction as in the case of Embodiment 1 and Embodiment 2, not only the code amount of the trees (block structures) is doubled, but also the code amount of motion information increases (usually, in many cases, luminance and chrominance have the same motion information, and thus a single piece of motion information suffices). In addition, there is also a problem that "skip", which indicates that neither the luminance nor the chrominance includes residuals, cannot be used. To solve these problems, the image decoding device 31 according to the present embodiment uses a Cross-component Linear Model (CCLM) prediction described below in detail, in order to generate a prediction image related to chrominance.

Principal Configuration of Image Decoding Device as Features of Embodiment 3

Figure 18:
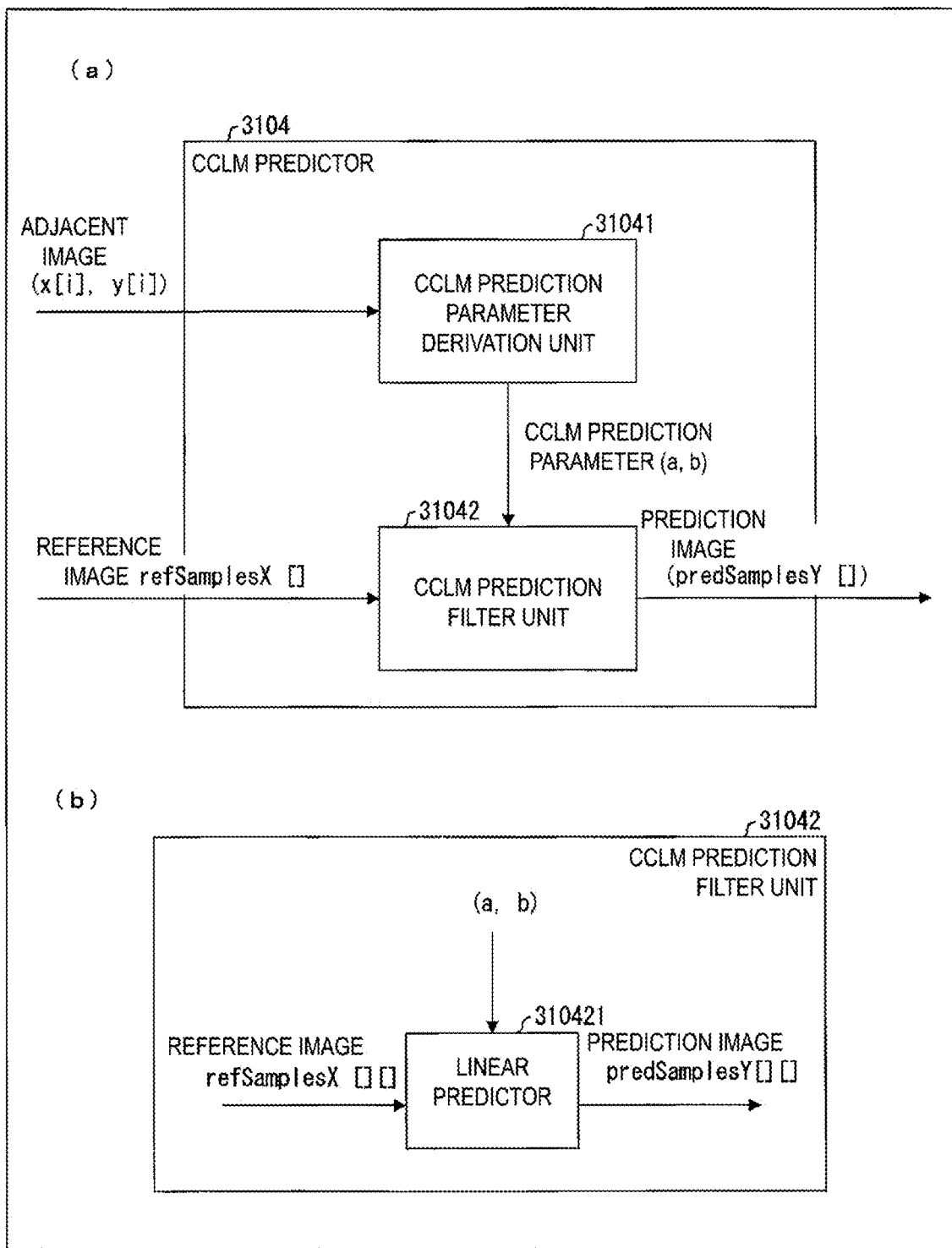
FIG. 18(a) is a block diagram illustrating a principal configuration of an image decoding device according to Embodiment 3 of the present invention.
FIG. 18(b) is a block diagram illustrating a part of the principal configuration illustrated in FIG. 18(a).

A principal configuration of the image decoding device 31 as features of the present embodiment will now be described in detail with reference to FIG. 18. (a) of FIG. 18 is a block diagram illustrating an example of a configuration of a CCLM predictor 3104 included in the intra prediction image generation unit 310. The CCLM predictor 3104 includes a CCLM parameter derivation unit 31041 and a CCLM prediction filter unit 31042. (b) of FIG. 18 is a block diagram illustrating a configuration example of the CCLM prediction filter unit 31042.

The CCLM parameter derivation unit 31041 uses pixel values (x[i], y[i], i=0, . . . , N) of a processed image adjacent to a target block as an input signal, and derives a CCLM prediction parameter. The CCLM parameter derivation unit 31041 outputs the derived CCLM prediction parameter (a, b) to the CCLM prediction filter unit 31042. Note that the pixel value x[i] represents a value of luminance pixels (Luma) in a region adjacent to the target block, and the pixel value y[i] represents a value of chrominance pixels (Cb, Cr) in a region adjacent to the target block.

The CCLM prediction filter unit 31042 performs a CCLM prediction on a luminance decoded image refSamplesX[ ][ ] of the target block being an input signal, and generates a chrominance prediction image predSamplesY[ ][ ] of the target block (here, Y represents Cb and Cr). In other words, the CCLM prediction filter unit 31042 generates a prediction image predSamplesY[ ][ ] from a reference image refSamplesX[ ][ ] being an input signal.

(b) of FIG. 18 illustrates a configuration of the CCLM prediction filter unit 31042. The CCLM prediction filter unit 31042 includes a linear predictor 310421. The linear predictor 310421 uses a reference image refSamplesX[ ][ ] as an input signal, and outputs a prediction image predSamplesY[ ][ ] by using a CCLM prediction parameter (a, b).

More specifically, the linear predictor 310421 uses a reference image related to luminance refSamplesLuma ("prediction image related to luminance" in Claims) as an input signal, derives prediction images of chrominance signals Cb and Cr, based on Formula (24) and Formula (25) below respectively using prediction parameters (a, b) and (a', b'), and outputs these derived prediction images as prediction images related to chrominance predSamplesCb and predSamplesCr.

$$\text{predSamples}Cb = (a * \text{refSamplesLuma}) >> \text{shift} + b \quad \text{Formula (24)}$$

$$\text{predSamples}Cr = (a' * \text{refSamplesLuma}) >> \text{shift} + b' \quad \text{Formula (25)}$$

Here, (a, b) represents a CCLM prediction parameter for the chrominance Cb (in a case that y[i] is Cb), and (a', b') represents a CCLM prediction parameter for the chrominance Cr (in a case that y[i] is Cr). (a, b) and (a', b') are hereinafter collectively described as (a, b).

Prediction Image Derivation Method

Figure 19:
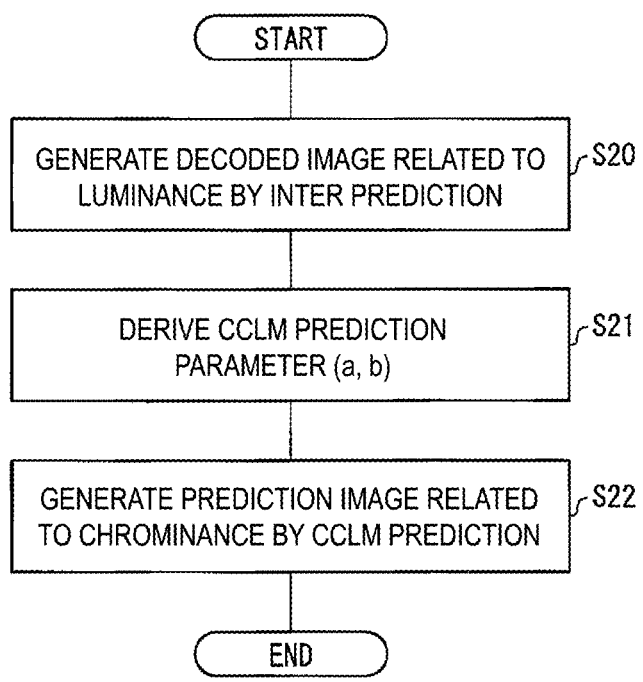
FIG. 19 is a flowchart for describing an example of a prediction image derivation method used by an image decoding device 31 according to Embodiment 3 of the present invention.

A prediction image derivation method used by the image decoding device 31 according to the present embodiment will be described in detail with reference to FIG. 19. FIG. 19 is a flowchart for describing an example of a prediction image derivation method used by the image decoding device 31 according to the present embodiment. Note that the prediction image derivation method according to present embodiment is a process performed after the block split method according to Embodiment 1 or the block split method according to Embodiment 2. Thus, description of Steps S0 to S5 and Steps S10 to S13 described above will be omitted.

First, by using an inter prediction parameter decoded by the inter prediction parameter decoding unit 303 and a reference picture (reference picture block) read from the reference picture memory 306, the inter prediction image generation unit 309 generates a prediction image related to luminance by an inter prediction, adds residual images of a decoded luminance block, and generates a decoded image of the luminance block (Step S20).

Next, the CCLM parameter derivation unit 31041 uses pixel values (x[i], y[i], i=0, . . . , N) of a processed image adjacent to the target block as an input signal, and derives a CCLM prediction parameter (a, b) (Step S21). Here, x[i] represents a luminance pixel value in a region adjacent to the target block, and y[i] represents a chrominance pixel value in a region adjacent to the target block.

Next, the linear predictor 310421 uses a reference image related to luminance refSamplesLuma (a luminance prediction image or a luminance decoded image of the target block) as an input signal, derives prediction images of chrominance signals Cb and Cr, based on Formula (24) and Formula (25) above using the prediction parameter (a, b), and outputs these derived prediction images as prediction images related to chrominance predSamplesCb and predSamplesCr (Step S22).

Usually, a CCLM prediction is applied in an intra prediction, in a case that a chrominance image of the target block has a higher correlation with a luminance image of the target block located at the same position than with an adjacent chrominance image. In the present embodiment, a CCLM prediction and an inter prediction (merge prediction) are used in combination (referred to as a CCLM merge mode). In this manner, in a case that a correlation between a chrominance image and a luminance image of the target block is high, more accurate prediction images can be generated even in an inter prediction, and coding efficiency can be enhanced by reducing prediction residuals.

As one of merge candidates of a merge mode described in Embodiment 1, a CCLM merge mode will be described. The CCLM merge mode is a mode in which a normal merge prediction using a prediction parameter of an adjacent block is applied to luminance, and a CCLM prediction is applied to chrominance. A merge candidate list mergeCand[ ] in this case is illustrated in the relation below. A1CCLM represents a CCLM merge candidate. A1, B1, B0, A0, and B2 in Formula (26) represent a prediction mode at a position of an adjacent block of the target block illustrated in FIG. 24.

$$\text{mergeCand}[\ ] = \{A1, B1, B0, A0, B2, Col, A1\text{CCLM}, \text{Combined}, \text{Zero}\} \quad \text{Formula (26)}$$

Figure 24:
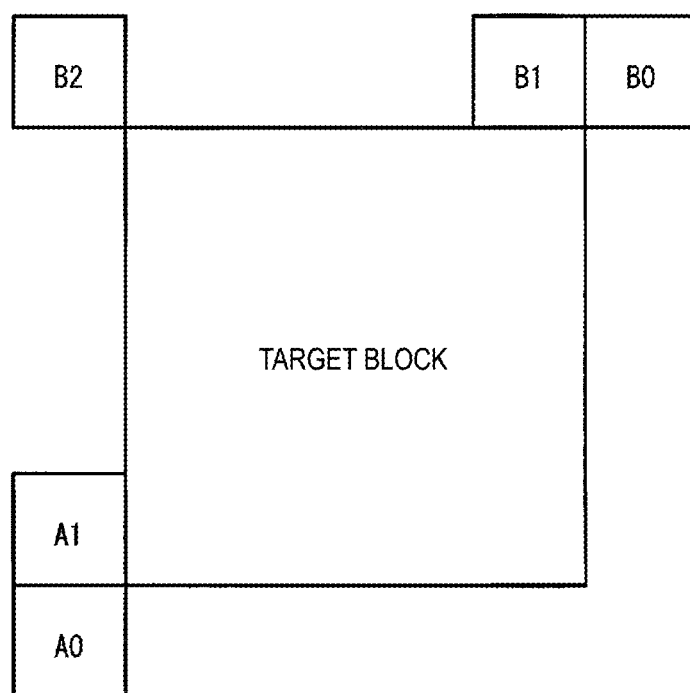
FIG. 24 is a diagram for describing a method of creating a merge candidate list according to Embodiment 3 of the present invention.

To describe the above further in detail, as a method of creating a merge candidate list, first, candidates are added in the order illustrated in Formula (27) below. Here, availableFlagX is a flag that indicates TRUE in a case that an adjacent block X is available, and indicates FALSE in a case that an adjacent block X is not available. Adjacent blocks X are illustrated in FIG. 24. Next, candidates are added to the merge candidate list in the order of A1CCLM, Combined merge, and Zero merge. Here, A1, B1, B0, A0, B2, and Col represent a mode using a prediction parameter of A1, B1, B0, A0, B2, and Col blocks for a luminance prediction and a chrominance prediction, respectively.

i=0 if (availableFlagA1)

mergeCandList[i++]=A1 if (availableFlagB1)

mergeCandList[i++]=B1 if (availableFlagB0)

mergeCandList[i++]=B0 if (availableFlagA0)

mergeCandList[i++]=A0 if (availableFlagB2)

mergeCandList[i++]=B2 if (availableFlagCol)

mergeCandList[i++]=Col if (availableFlagA1)

mergeCandList[i++]=A1CCLM   Formula (27)

In a case that A1CCLM is selected as a merge candidate (merge_idx indicates A1CCLM), for luminance, a prediction image is generated by using the prediction parameter of A1 at the first position in the merge candidate list, adds separately decoded prediction residual images, and generates a decoded image. For chrominance, a prediction image is generated by a CCLM prediction with the use of the prediction image or the decoded image of luminance, adds separately decoded prediction residual images, and generates a decoded image. The decoded image may further be filtered with a deblocking filter and the like. However, in a case that a decoded image is used in a CCLM prediction, a decoded image before applying the deblocking filter is more preferable.

Note that the merge CCLM mode is not limited to A1CCLM using the prediction parameter of A1 to generate a prediction image of luminance. Instead, for example, the merge CCLM mode may be B1CCLM, B0CCLM, A0CCLM, B2CCLM, and ColCCLM using the prediction parameters of B1, B0, A0, B2, and Col to generate a prediction image of luminance. For example, a prediction image for luminance may be generated by using a merge candidate that is available first in the merge candidate order of A1, B1, B0, A0, B2, Col, and the like. For chrominance, a prediction image may be generated by a CCLM prediction with the use of a decoded image of the luminance.

Additional Configuration of Present Embodiment

Figure 20:
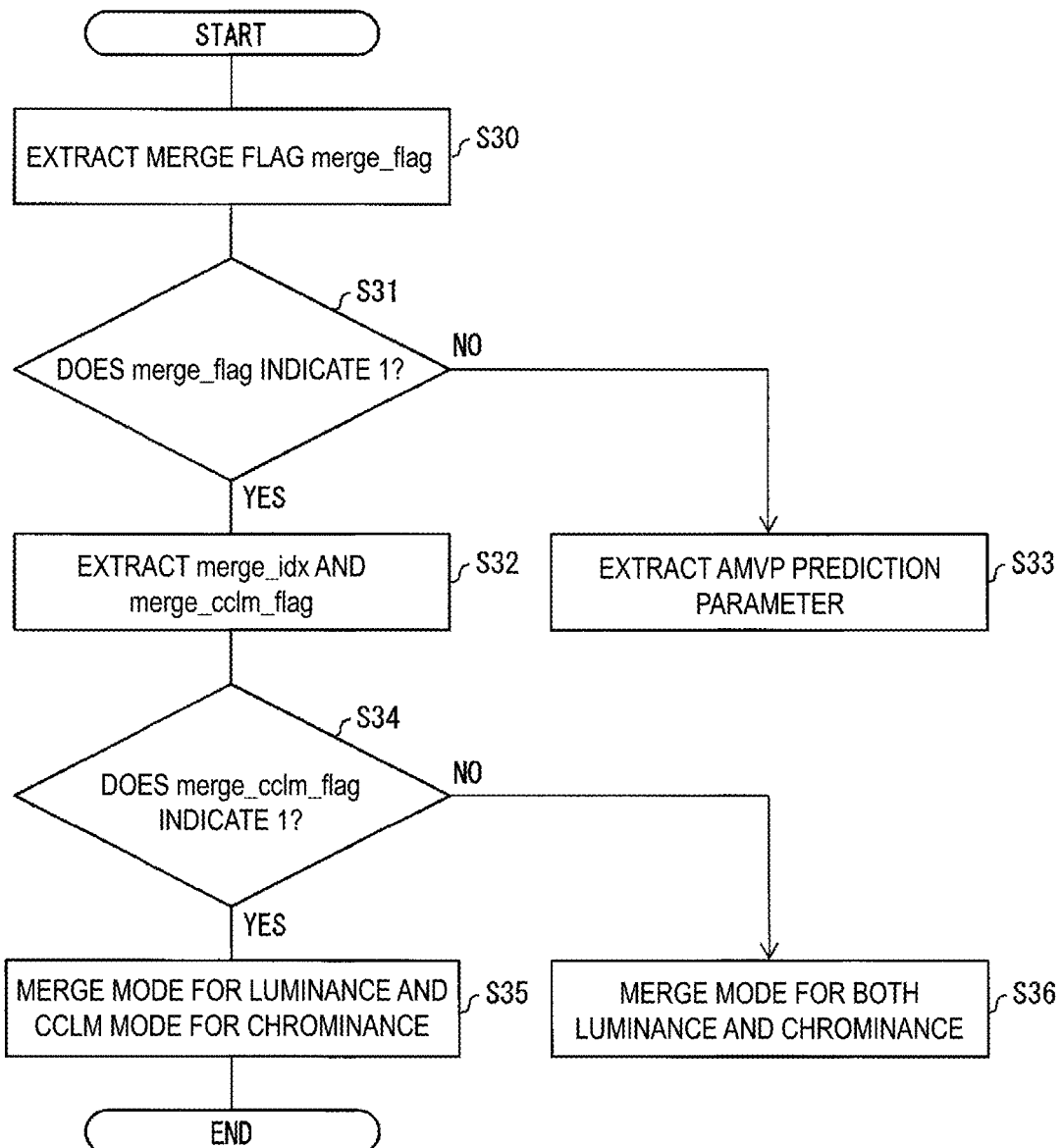
FIG. 20 is a flowchart for describing an example of a method of determining a prediction mode by the image decoding device 31 according to Embodiment 3 of the present invention.

As a modified example of Embodiment 3, an example in which the CCLM merge mode is notified by a flag different from a merge index will be described below with reference to FIG. 20. FIG. 20 is a flowchart for describing a method of determining a prediction mode according to the present embodiment.

First, the prediction parameter decoding unit 302 indicates the PU information decoding unit 12 to decode a merge flag merge_flag, and extracts the merge flag merge_flag (Step S30).

Next, the prediction parameter decoding unit 302 determines whether or not the extracted merge flag merge_flag indicates 1 (Step S31). In a case that the merge flag merge_flag indicates 1 (YES in Step S31), the processing proceeds to Step S32. In a case that the merge flag merge_flag indicates 0 (NO in Step S31), the processing proceeds to Step S33.

In Step S32, the prediction parameter decoding unit 302 indicates the PU information decoding unit 12 to decode a merge index merge_idx, and extracts the merge index merge_idx as a prediction parameter related to a merge prediction. Furthermore, the prediction parameter decoding unit 302 indicates the PU information decoding unit 12 to decode merge_cclm_flag indicating whether or not a prediction image related to chrominance is to be derived with a CCLM mode, and extracts merge_cclm_flag.

In Step S33, the prediction parameter decoding unit 302 indicates the PU information decoding unit 12 to decode an AMVP prediction parameter, and extracts the AMVP prediction parameter (the following steps correspond to the AMVP prediction mode).

As a step subsequent to Step S32, the prediction parameter decoding unit 302 determines whether or not the extracted merge_cclm_flag indicates 1 (Step S34). In a case that merge_cclm_flag indicates 1 (YES in Step S34), the processing proceeds to Step S35. In a case that merge_cclm_flag indicates 0 (YES in Step S34), the processing proceeds to Step S36.

In Step S35, the prediction parameter decoding unit 302 selects a merge candidate indicated by the extracted merge index merge_idx as an inter prediction parameter of a target PU. The merge candidate used herein is any merge candidate in the merge candidate mergeCand[ ] illustrated in Formula (28) below.

$$mergeCand[\ ] = \{A1, B1, B0, A0, B2, Col, \text{Combined}, \text{Zero}\} \quad \text{Formula (28)}$$

Steps subsequent to Step S35 are Step S20, Step S21, and Step S22 described above. Specifically, based on the selected merge candidate (merge mode), a prediction image related to luminance is generated by an inter prediction (Step S20), and a CCLM prediction parameter (a, b) is derived (Step S21). Chrominance signals Cb and Cr of the prediction image using the prediction parameter (a, b) are derived (Step S22).

In Step S36, the prediction parameter decoding unit 302 selects a merge candidate indicated by the extracted merge index merge_idx as an inter prediction parameter of a target PU. The merge candidate used herein is any merge candidate in the merge candidate mergeCand[ ] illustrated in Formula (28) above.

Note that steps (not illustrated) after Step S36 correspond to a normal merge mode. By using an inter prediction parameter derived by the inter prediction parameter decoding unit 303 and a reference picture (reference picture block) read from the reference picture memory 306, the inter prediction image generation unit 309 generates a prediction image related to luminance and a prediction image related to chrominance by an inter prediction.

In the present modified example, a flag (merge_CCLM_flag) indicating whether or not a CCLM prediction is to be used for chrominance is used, in addition to the merge index. In Embodiment 3, in a case that a CCLM prediction is used for chrominance, only the A1 block (limited merge candidate) can be selected for luminance. In the present modified example, however, even in a case that a CCLM prediction is used for chrominance, all the candidates that may be available in a normal merge prediction for luminance can be selected. In other words, there is an advantage in that efficiency of a chrominance prediction can be enhanced without sacrificing efficiency of a luminance prediction.

Combination with Embodiment 1 or Embodiment 2

Figure 21:
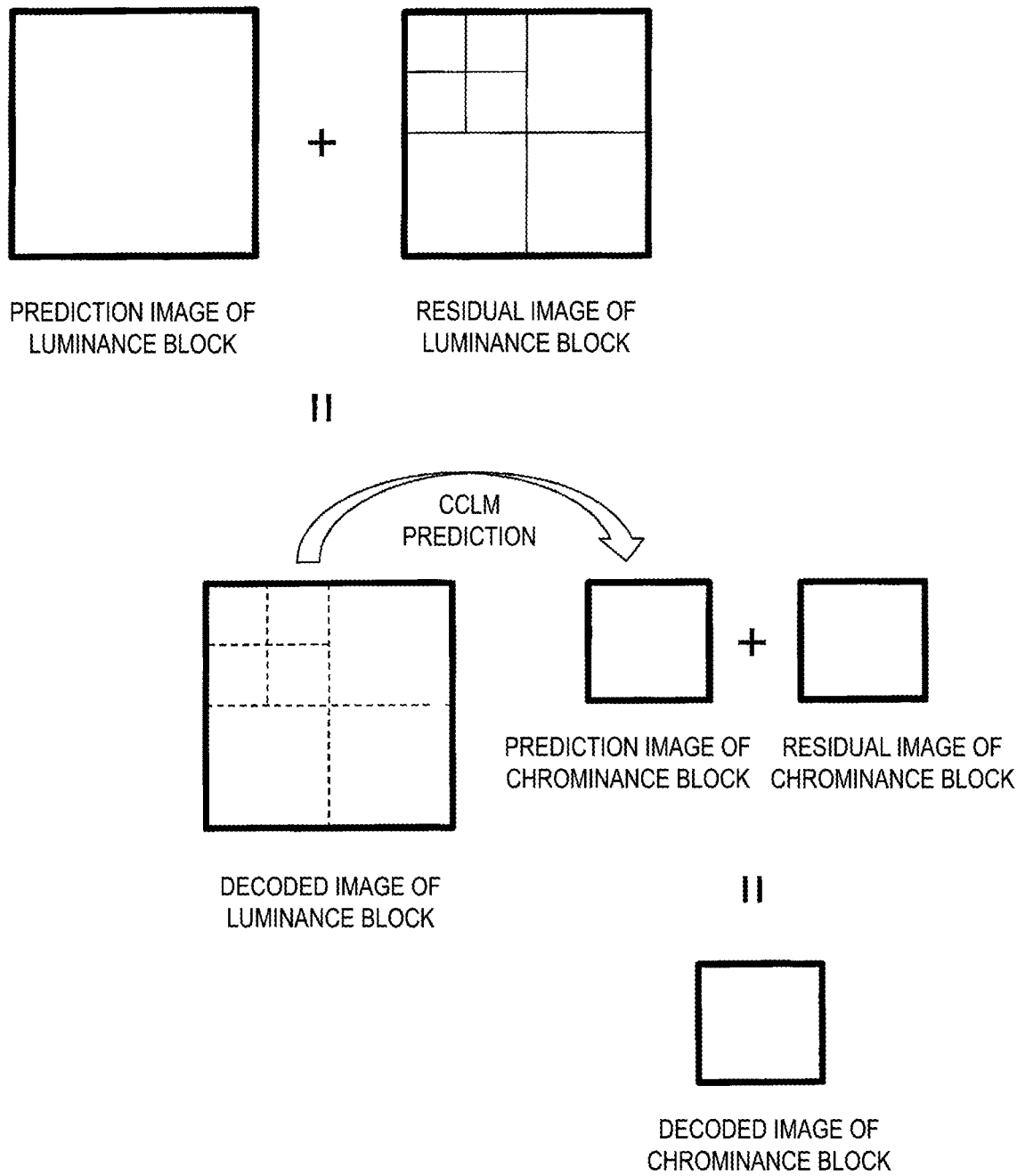
FIG. 21 is a diagram for describing a combination of the block split method according to Embodiment 1 and the prediction image derivation method according to Embodiment 3.
Figure 22:
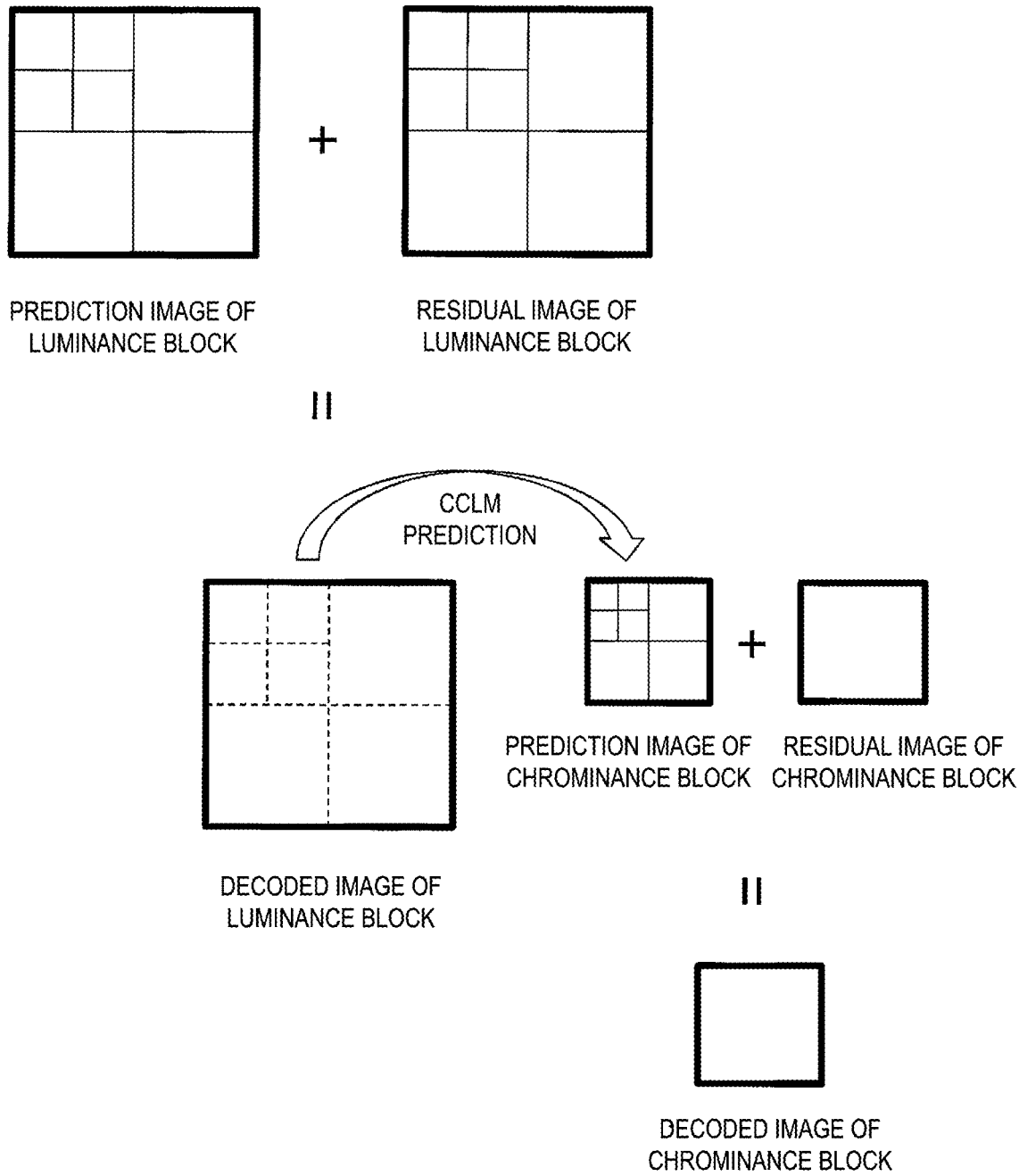
FIG. 22 is a diagram for describing a combination of the block split method according to Embodiment 2 and the prediction image derivation method according to Embodiment 3.
Figure 23:
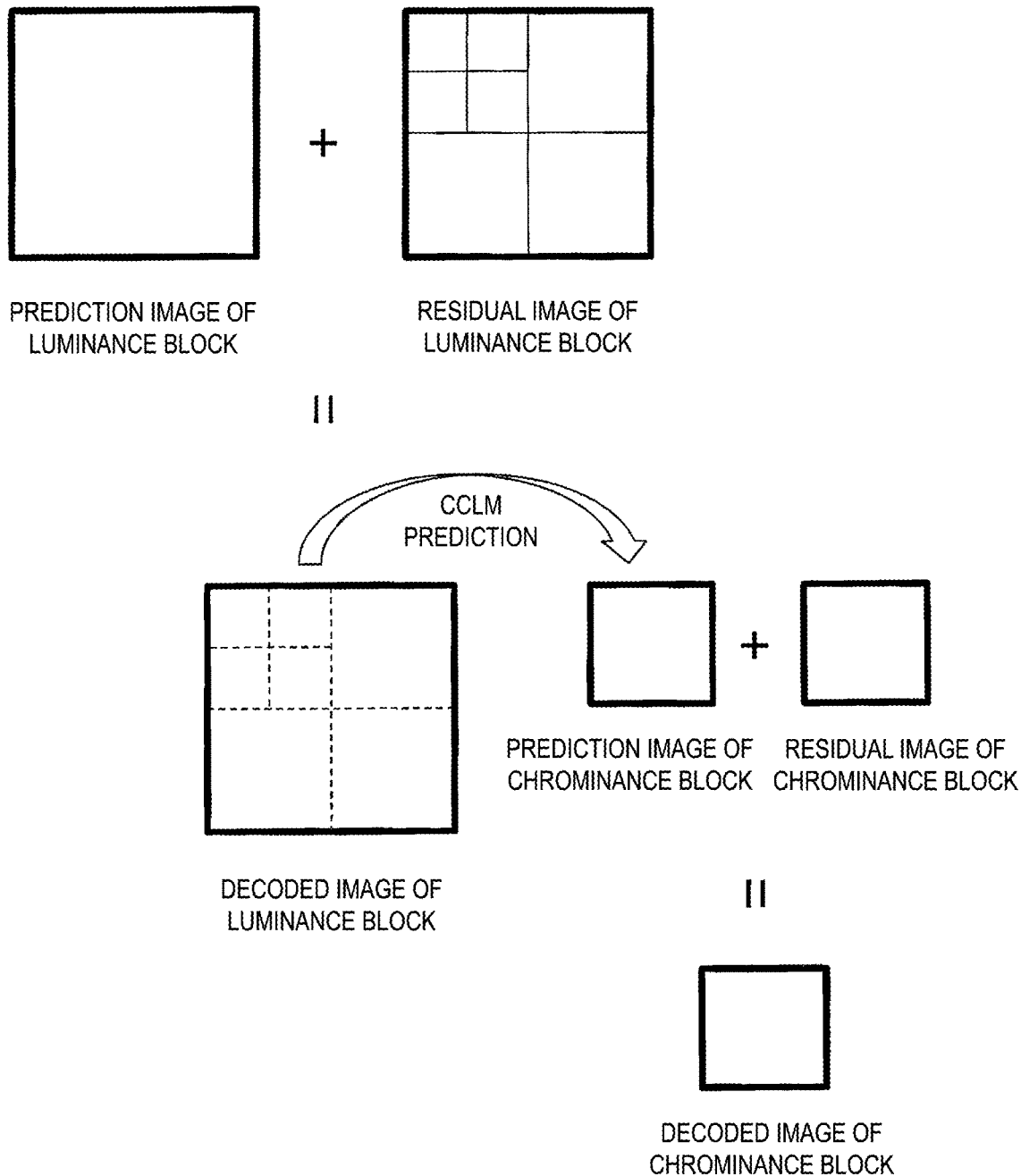
FIG. 23 is a diagram for describing a combination of the modified example of the block split method according to Embodiment 2 and the prediction image derivation method according to Embodiment 3.

A combination of the prediction image derivation method according to the present embodiment and the block split method according to Embodiment 1 or Embodiment 2 will be described below with reference to FIG. 21 to FIG. 23. FIG. 21 is a diagram for describing a combination of the block split method according to Embodiment 1 and the prediction image derivation method according to Embodiment 3. FIG. 22 is a diagram for describing a combination of the block split method according to Embodiment 2 and the prediction image derivation method according to Embodiment 3. FIG. 23 is a diagram for describing a combination of the modified example of the block split method according to Embodiment 2 and the prediction image derivation method according to Embodiment 3.

As illustrated in FIG. 21, the addition unit 312 adds (1) and (2) below, and generates a decoded image of a luminance block.

(1) A prediction image of a luminance block generated by the prediction image generation unit 308, based on PU information of a PU decoded by the PU information decoding unit 12 in Step S2

(2) Residual images of the luminance block generated by the inverse quantization and inverse transformer unit 311, based on a quantized prediction residual of a TU decoded by the TU decoding unit 22 in Step S4

Then, in Step S22, the linear predictor 310421 uses the prediction image or the decoded image of the luminance block as an input signal, and derives a prediction image of a chrominance block by a CCLM prediction. FIG. 21 illustrates an example in which the decoded image is used as an input signal, and a prediction image of a chrominance block is derived by a CCLM prediction.

Then, the addition unit 312 adds the prediction image of the chrominance block and a residual image of the chrominance block generated by the inverse quantization and inverse transformer unit 311, based on the quantized prediction residual decoded by the TU decoding unit 22 in Step S4, and generates a decoded image of the chrominance block.

As illustrated in FIG. 22, the addition unit 312 adds (3) and (4) below, and generates a decoded image of a luminance block.

(1) A prediction image of a luminance block generated by the prediction image generation unit 308, based on PU information of a PU included in a CU subjected to partial split, by the PU information decoding unit 12 in Step S12

(4) Residual images of the luminance block generated by the inverse quantization and inverse transformer unit 311, based on a quantized prediction residual decoded by the TU decoding unit 22 in Step S13 with reference to a TU included in the CU subjected to partial split Then, in Step S22, the linear predictor 310421 uses the prediction image or the decoded image of the luminance block as an input signal, and derives a prediction image of a chrominance block for each PU by a CCLM prediction. FIG. 22 illustrates an example in which the decoded image is used as an input signal, and a prediction image of a chrominance block is derived by a CCLM prediction. Then, the addition unit 312 adds the prediction image of the chrominance block and a residual image of the chrominance block generated by the inverse quantization and inverse transformer unit 311, based on the quantized prediction residual decoded by the TU decoding unit 22 in Step S13 with reference to the non-split TU, and generates a decoded image of the chrominance block.

As illustrated in FIG. 23, the addition unit 312 adds (5) and (6), and generates a decoded image of a luminance block.

(5) A prediction image of a luminance block generated by the prediction image generation unit 308, based on PU information of a PU not subjected to split, by the PU information decoding unit 12, as described in Modified Example 1 of Embodiment 2

(6) Residual images of the luminance block generated by the inverse quantization and inverse transformer unit 311, based on a quantized prediction residual decoded by the TU decoding unit 22 in Step S13 with reference to a TU included in the CU subjected to partial split Then, in Step S22, the linear predictor 310421 uses the prediction image or the decoded image of the luminance block as an input signal, and derives a prediction image of a chrominance block by a CCLM prediction. Then, the addition unit 312 adds the prediction image of the chrominance block and a residual image of the chrominance block generated by the inverse quantization and inverse transformer unit 311, based on the quantized prediction residual decoded by the TU decoding unit 22 in Step S13 with reference to the non-split TU, and generates a decoded image of the chrominance block.

Gist of Embodiment 3

As described above, the image decoding device 31 according to the present embodiment generates a prediction image related to luminance in a target prediction unit (target PU), by using a prediction parameter of a reference unit (processed PU adjacent to the target PU), and the image decoding device 31 generates a prediction image related to chrominance in the target prediction unit (target PU), with reference to the prediction image or a decoded image of the luminance in the target prediction unit.

According to the configuration described above, predictions different between luminance and chrominance (an intra prediction and an inter prediction) can be used by sharing a tree structure of luminance and a tree structure of chrominance. Therefore, a code amount related to a tree structure is not increased. In a case that the above prediction is selected as one of merge mode candidates, the code amount that is related to an intra prediction and an inter prediction and is necessary for switching between prediction methods of luminance and chrominance can be minimized.

According to the configuration described above, at the time of generating a prediction image related to chrominance, an already generated prediction image or decoded image of luminance can be used. Therefore, in a case that motion information (motion vector) is correct for luminance but is incorrect for chrominance, for example, a more accurate prediction image can be generated, and the code amount can be reduced.

The image decoding device 31 according to the present embodiment may determine a mode (for example, a merge mode or a CCLM mode) related to a generation method of the prediction image related to the luminance and the prediction image related to the chrominance, according to a flag (for example, merge_cclm_flag).

According to the configuration described above, a CCLM prediction can be applied to chrominance without limiting a merge candidate of luminance, and the code amount can be further reduced. The code amount of a flag necessary in a case of selecting the above prediction can be minimized by limiting to the merge mode.

Image Encoding Device

The image encoding device 11 including a configuration similar to that of the image decoding device 31 according to Embodiments 1 to 3 described above is also included in one embodiment of the present invention.

For example, in a transform tree, the image encoding device 11 including a configuration similar to that of the image decoding device 31 according to Embodiment 1 splits a transform unit corresponding to luminance and then codes a transform coefficient related to the luminance, and does not split a transform unit corresponding to chrominance and codes a transform coefficient related to the chrominance.

According to the configuration described above, a transform unit corresponding to chrominance is not split, and therefore concentration of residual energy corresponding to chrominance can be maintained. Accordingly, coding of residuals can be efficiently performed, and a code amount can be reduced.

In a transform tree included in a coding unit (CU), the image encoding device 11 including a configuration similar to that of the image decoding device 31 according to Embodiment 2 splits a transform unit (TU) corresponding to luminance and then codes a transform coefficient related to the luminance, and does not split a transform unit (TU) corresponding to chrominance and codes a transform coefficient related to the chrominance. In a prediction tree included in the coding unit (CU), the image decoding device 31 splits a prediction unit (PU) corresponding to luminance and then codes PU information related to the prediction unit corresponding to the luminance, and in the prediction tree, the image decoding device 31 splits a prediction unit (PU) corresponding to chrominance and then codes PU information related to the prediction unit corresponding to the chrominance.

According to the configuration described above, only a transform unit corresponding to luminance is split, and therefore a prediction unit can be split, with concentration of residual energy corresponding to chrominance being maintained.

The image encoding device 11 including a configuration similar to that of the image decoding device 31 according to Embodiment 3 generates a prediction image related to luminance in a target prediction unit (target PU), by using a prediction parameter of a reference unit (processed PU adjacent to the target PU), and the image encoding device 11 generates a prediction image related to chrominance in the target prediction unit (target PU), with reference to the prediction image or a decoded image of the luminance in the target prediction unit.

According to the configuration described above, at the time of generating a prediction image related to chrominance, an already generated prediction image or decoded image of luminance can be used. Therefore, a more accurate prediction image can be generated, and the code amount can be reduced.

Implementation Examples by Software

Note that, part of the image encoding device 11 and the image decoding device 31 in the above-mentioned embodiments, for example, the entropy decoding unit 301, the prediction parameter decoding unit 302, the loop filter 305, the prediction image generation unit 308, the inverse quantization and inverse transformer unit 311, the addition unit 312, the prediction image generation unit 101, the subtraction unit 102, the transform and quantization unit 103, the entropy encoder 104, the inverse quantization and inverse transformer unit 105, the loop filter 107, the coding parameter determination unit 110, and the prediction parameter encoder 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image encoding device 11 or the image decoding device 31, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image encoding device 11 and the image decoding device 31 in the embodiments described above may be realized as an integrated circuit such as a Large Scale Integration (LSI). Each function block of the image encoding device 11 and the image decoding device 31 may be individually realized as processors, or part or all may be integrated into processors. Furthermore, a circuit integration technique is not limited to the LSI, and may be realized with a dedicated circuit or a general-purpose processor. In a case that with advances in semiconductor technology, a circuit integration technology with which an LSI is replaced appears, an integrated circuit based on the technology may be used.

One embodiment of the present invention has been described in detail above referring to the drawings, but the specific configuration is not limited to the above embodiments and various amendments can be made to a design that fall within the scope that does not depart from the gist of the present invention.

APPLICATION EXAMPLES

The above-mentioned image encoding device 11 and the image decoding device 31 can be utilized being installed to various devices performing transmission, reception, recording, and regeneration of videos. Note that, videos may be natural videos imaged by cameras or the like, or may be artificial videos (including CG and GUI) generated by computers or the like.

At first, referring to FIG. 8, it will be described that the above-mentioned image encoding device 11 and the image decoding device 31 can be utilized for transmission and reception of videos.

Figure 8:
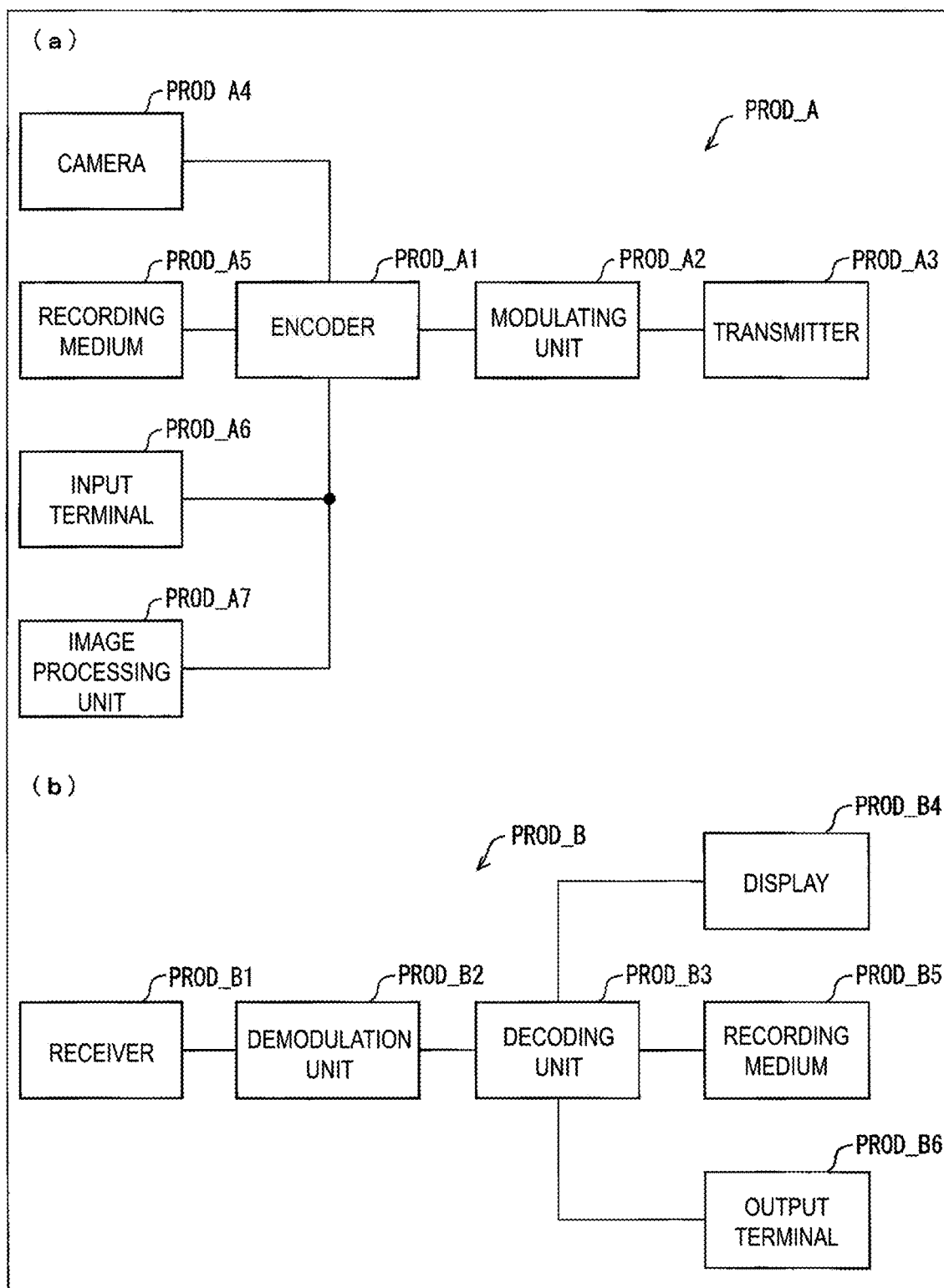
FIG. 8 is a diagram illustrating configurations of a transmission device equipped with the image encoding device and a reception device equipped with the image decoding device according to one embodiment of the present invention. (a) illustrates the transmission device equipped with the image encoding device, and (b) illustrates the reception device equipped with the image decoding device.

(a) of FIG. 8 is a block diagram illustrating a configuration of a transmission device PROD_A installed with the image encoding device 11. As illustrated in (a) of FIG. 8, the transmission device PROD_A includes a encoder PROD_A1 which obtains coded data by coding videos, a modulating unit PROD_A2 which obtains modulation signals by modulating carrier waves with the coded data obtained by the encoder PROD_A1, and a transmitter PROD_A3 which transmits the modulation signals obtained by the modulating unit PROD_A2. The above-mentioned image encoding device 11 is utilized as the encoder PROD_A1.

The transmission device PROD_A may further include a camera PROD_A4 imaging videos, a recording medium PROD_A5 recording videos, an input terminal PROD_A6 to input videos from the outside, and an image processing unit A7 which generates or processes images, as sources of supply of the videos input into the encoder PROD_A1. In (a) of FIG. 8, although the configuration that the transmission device PROD_A includes these all is exemplified, a part may be omitted.

Note that the recording medium PROD_A5 may record videos which are not coded, or may record videos coded in a coding scheme for recording different than a coding scheme for transmission. In the latter case, a decoding unit (not illustrated) to decode coded data read from the recording medium PROD_A5 according to coding scheme for recording may be interleaved between the recording medium PROD_A5 and the encoder PROD_A1.

(b) of FIG. 8 is a block diagram illustrating a configuration of a reception device PROD_B installed with the image decoding device 31. As illustrated in (b) of FIG. 8, the reception device PROD_B includes a receiver PROD_B1 which receives modulation signals, a demodulation unit PROD_B2 which obtains coded data by demodulating the modulation signals received by the receiver PROD_B1, and a decoding unit PROD_B3 which obtains videos by decoding the coded data obtained by the demodulation unit PROD_B2. The above-mentioned image decoding device 31 is utilized as the decoding unit PROD_B3.

The reception device PROD_B may further include a display PROD_B4 displaying videos, a recording medium PROD_B5 to record the videos, and an output terminal PROD_B6 to output videos outside, as supply destination of the videos output by the decoding unit PROD_B3. In (b) of FIG. 8, although the configuration that the reception device PROD_B includes these all is exemplified, a part may be omitted.

Note that the recording medium PROD_B5 may record videos which are not coded, or may be coded in a coding scheme for recording different from a coding scheme for transmission. In the latter case, a encoder (not illustrated) to code videos acquired from the decoding unit PROD_B3 according to a coding scheme for recording may be interleaved between the decoding unit PROD_B3 and the recording medium PROD_B5.

Note that the transmission medium transmitting modulation signals may be wireless or may be wired. The transmission aspect to transmit modulation signals may be broadcasting (here, referred to as the transmission aspect where the transmission target is not specified beforehand) or may be telecommunication (here, referred to as the transmission aspect that the transmission target is specified beforehand). Thus, the transmission of the modulation signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of transmission device PROD_A/reception device PROD_B transmitting and/or receiving modulation signals in radio broadcasting. Broadcasting stations (broadcasting equipment, and the like)/receiving stations (television receivers, and the like) of cable television broadcasting are an example of transmission device PROD_A/reception device PROD_B transmitting and/or receiving modulation signals in cable broadcasting.

Servers (work stations, and the like)/clients (television receivers, personal computers, smartphones, and the like) for Video On Demand (VOD) services, video hosting services using the Internet and the like are an example of transmission device PROD_A/reception device PROD_B transmitting and/or receiving modulation signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multifunctional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmission device PROD_A and the reception device PROD_B.

Next, referring to FIG. 9, it will be described that the above-mentioned image encoding device 11 and the image decoding device 31 can be utilized for recording and regeneration of videos.

Figure 9:
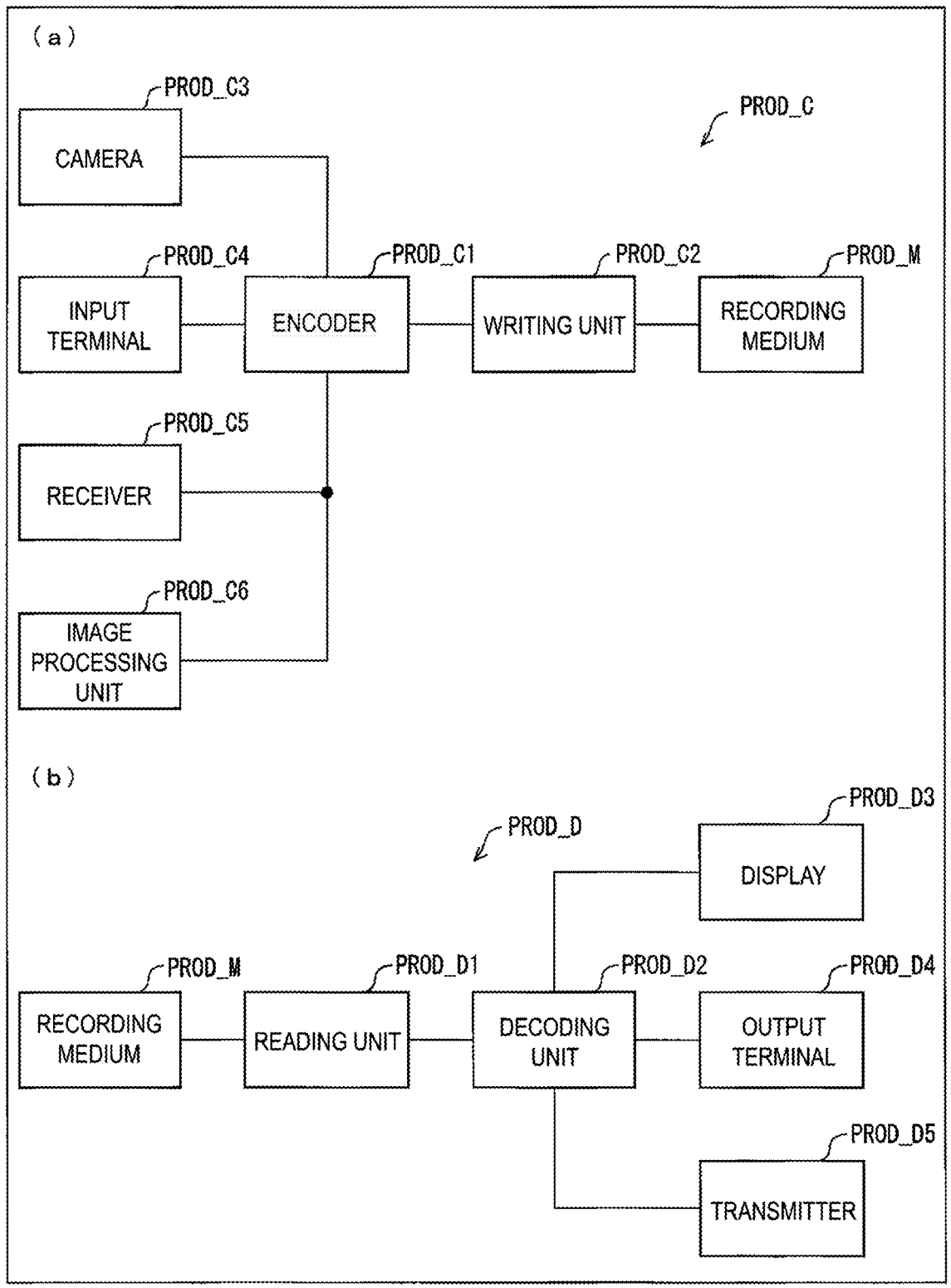
FIG. 9 is a diagram illustrating configurations of a recording device equipped with the image encoding device and a regeneration device equipped with the image decoding device according to one embodiment of the present invention. (a) illustrates the recording device equipped with the image encoding device, and (b) illustrates the regeneration device equipped with the image decoding device.

(a) of FIG. 9 is a block diagram illustrating a configuration of a recording device PROD_C installed with the above-mentioned image encoding device 11. As illustrated in (a) of FIG. 9, the recording device PROD_C includes a encoder PROD_C1 which obtains coded data by coding a video, and a writing unit PROD_C2 which writes the coded data obtained by the encoder PROD_C1 in a recording medium PROD_M. The above-mentioned image encoding device 11 is utilized as the encoder PROD_C1.

Note that the recording medium PROD_M may be (1) a type built in the recording device PROD_C such as Hard Disk Drive (HDD) or Solid State Drive (SSD), may be (2) a type connected to the recording device PROD_C such as an SD memory card or a Universal Serial Bus (USB) flash memory, and may be (3) a type loaded in a drive device (not illustrated) built in the recording device PROD_C such as Digital Versatile Disc (DVD) or Blu-ray Disc (BD: trade name).

The recording device PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the encoder PROD_C1. In (a) of FIG. 9, although the configuration that the recording device PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoding unit (not illustrated) for transmission to decode coded data coded in a coding scheme for transmission may be interleaved between the receiver PROD_C5 and the encoder PROD_C1.

Examples of such recording device PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is also an example of such recording device PROD_C.

(b) of FIG. 9 is a block diagram illustrating a configuration of a regeneration device PROD_D installed with the above-mentioned image decoding device 31. As illustrated in (b) of FIG. 9, the regeneration device PROD_D includes a reading unit PROD_D1 which reads coded data written in the recording medium PROD_M, and a decoding unit PROD_D2 which obtains a video by decoding the coded data read by the reading unit PROD_D1. The above-mentioned image decoding device 31 is utilized as the decoding unit PROD_D2.

Note that the recording medium PROD_M may be (1) a type built in the regeneration device PROD_D such as HDD or SSD, may be (2) a type connected to the regeneration device PROD_D such as an SD memory card or a USB flash memory, and may be (3) a type loaded in a drive device (not illustrated) built in the regeneration device PROD_D such as DVD or BD.

The regeneration device PROD_D may further include a display PROD_D3 displaying a video, an output terminal PROD_D4 to output the video to the outside, and a transmitter PROD_D5 which transmits the video, as the supply destination of the video output by the decoding unit PROD_D2. In (b) of FIG. 9, although the configuration that the regeneration device PROD_D includes these all is exemplified, a part may be omitted.

Note that the transmitter PROD_D5 may transmit a video which is not coded, or may transmit coded data coded in a coding scheme for transmission different than a coding scheme for recording. In the latter case, a encoder (not illustrated) to code a video in a coding scheme for transmission may be interleaved between the decoding unit PROD_D2 and the transmitter PROD_D5.

Examples of such regeneration device PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or graphics tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such regeneration device PROD_D.

Realization as Hardware and Realization as Software

Each block of the above-mentioned image decoding device 31 and the image encoding device 11 may be realized as a hardware by a logical circuit formed on an integrated circuit (IC chip), or may be realized as a software using a Central Processing Unit (CPU).

In the latter case, each of the devices includes a CPU performing a command of a program to implement each function, a Read Only Memory (ROM) storing the program, a Random Access Memory (RAM) developing the program, a storage device (recording medium) such as a memory storing the program and various data, and the like. The purpose of the embodiments of the present invention can be achieved by supplying, to each of the devices, the recording medium recording readably the program code (execution form program, intermediate code program, source program) of the control program of each of the devices which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the devices is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier wave where the program code is embodied by electronic transmission.

The embodiments of the present invention are not limited to the above-mentioned embodiments, and various modifications are possible within the scope of the claims. Thus, embodiments obtained by combining technical means modified appropriately within the scope defined by claims are included in the technical scope of the present invention.

CROSS-REFERENCE OF RELATED APPLICATION

This application claims the benefit of priority to JP 2017-090481 filed on Apr. 28, 2017, which is incorporated herein by reference in its entirety.

INDUSTRIAL APPLICABILITY

The embodiments of the present invention can be suitably applied to an image decoding device to decode coded data where graphics data is coded, and an image encoding device to generate coded data where graphics data is coded. The embodiments of the present invention can be suitably applied to a data structure of coded data generated by the image encoding device and referred to by the image decoding device.

REFERENCE SIGNS LIST

11 Image encoding device
31 Image decoding device
301 Entropy decoding unit
302 Prediction parameter decoding unit
303 Inter prediction parameter decoding unit
304 Intra prediction parameter decoding unit
308 Prediction image generation unit
309 Inter prediction image generation unit
310 Intra prediction image generation unit
311 Inverse quantization and inverse transformer unit
31041 CCLM parameter derivation unit
31042 CCLM prediction filter unit
310421 Linear predictor

The invention claimed is:
1. An image decoding device for decoding a picture for a coding node, the image decoding device comprising:
   a coding unit (CU) decoding circuit configured to decode prediction unit (PU) information and a quantized prediction residual of a transform unit obtained by splitting the coding node;
   a transform coefficient decoding circuit configured to decode a transform coefficient for the transform unit based on the quantized prediction residual;

a prediction image generation circuit configured to generate a prediction image based on the PU information; and
an addition circuit configured to add a prediction residual derived from the transform coefficient and the prediction image, and generate a decoded image,
wherein the CU decoding circuit decodes a split luma flag indicating whether or not a luminance transform unit is split, splits the luminance transform unit and generates splitted luminance transform units based on the split luma flag, decodes a quantized prediction residual related to a luminance by using a top left coordinates of one of the splitted luminance transform units, determines a top left coordinates of the coding node including the transform unit, and decodes a quantized prediction residual related to a chrominance by using the top-left coordinates of the coding node.

* * * * *